US011961477B2

(12) United States Patent
Zhang et al.

(10) Patent No.: US 11,961,477 B2
(45) Date of Patent: Apr. 16, 2024

(54) PIXEL DRIVING CIRCUIT, AND DISPLAY PANEL AND DRIVING METHOD THEREOF

(71) Applicants: Wuhan Tianma Micro-Electronics Co., Ltd., Wuhan (CN); Wuhan Tianma Microelectronics Co., Ltd. Shanghai Branch, Shanghai (CN)

(72) Inventors: Mengmeng Zhang, Shanghai (CN); Xingyao Zhou, Shanghai (CN)

(73) Assignees: Wuhan Tianma Micro-Electronics Co., Ltd., Wuhan (CN); Wuhan Tianma Microelectronics Co., Ltd. Shanghai Branch, Shanghai (CN)

( * ) Notice: Subject to any disclaimer, the term of this patent is extended or adjusted under 35 U.S.C. 154(b) by 80 days.

(21) Appl. No.: 17/197,007

(22) Filed: Mar. 9, 2021

(65) Prior Publication Data

US 2022/0180810 A1 Jun. 9, 2022

(30) Foreign Application Priority Data

Dec. 4, 2020 (CN) ........................ 202011412419.X

(51) Int. Cl.
*G09G 3/3241* (2016.01)

(52) U.S. Cl.
CPC ... *G09G 3/3241* (2013.01); *G09G 2310/0272* (2013.01); *G09G 2310/0297* (2013.01)

(58) Field of Classification Search
None
See application file for complete search history.

(56) References Cited

U.S. PATENT DOCUMENTS

2018/0151123 A1* 5/2018 Li ........................ H10K 50/805
2019/0180681 A1* 6/2019 Wang .................. G09G 3/3291
2020/0074928 A1* 3/2020 Li ........................ G09G 3/3233
2021/0104196 A1* 4/2021 Yuan .................... G09G 3/3258
2021/0125562 A1* 4/2021 Li ........................ G09G 3/3258
2021/0134219 A1* 5/2021 Huang ................. G09G 3/3233
2021/0134917 A1* 5/2021 Li ........................ G09G 3/3275
(Continued)

FOREIGN PATENT DOCUMENTS

CN 106023895 A 10/2016
CN 107256695 A 10/2017
(Continued)

*Primary Examiner* — Parul H Gupta
(74) *Attorney, Agent, or Firm* — Anova Law Group, PLLC

(57) ABSTRACT

A pixel driving circuit, a display panel and a driving method are provided. The pixel driving circuit includes: a first power signal terminal receiving a first voltage signal and a second power signal terminal receiving a second voltage signal; a driving transistor configured to provide a driving current in a light-emitting stage; a light-emitting component, connected in series between the driving transistor and the second power signal terminal and configured to emit light in response to the driving current; a light-emitting controller connected in series between the first power signal terminal and the light-emitting component; and a bias unit, electrically connected between the third node and a second output terminal of a light-emitting control circuit, and in response to a first control signal, configured to transmit a first signal outputted by the light-emitting control circuit to a third node to adjust a bias state of the driving transistor.

28 Claims, 16 Drawing Sheets

(56) References Cited

U.S. PATENT DOCUMENTS

| | | | | |
|---|---|---|---|---|
| 2021/0150985 | A1* | 5/2021 | Li | G09G 3/3233 |
| 2021/0158755 | A1* | 5/2021 | Li | G09G 3/3266 |
| 2021/0210005 | A1* | 7/2021 | Zhou | G09G 3/325 |
| 2021/0264857 | A1* | 8/2021 | Wang | G09G 3/3258 |
| 2021/0287605 | A1* | 9/2021 | Wang | G09G 3/2092 |
| 2022/0415257 | A1* | 12/2022 | Liu | G09G 3/3233 |

FOREIGN PATENT DOCUMENTS

| | | | |
|---|---|---|---|
| CN | 109285500 | A | 1/2019 |
| CN | 109448637 | A | 3/2019 |
| CN | 109584795 | A | 4/2019 |
| CN | 109949743 | A | 6/2019 |
| CN | 110858471 | A | 3/2020 |

* cited by examiner

PIXEL DRIVING CIRCUIT, AND DISPLAY PANEL AND DRIVING METHOD THEREOF

CROSS-REFERENCE TO RELATED APPLICATION

This application claims the priority of Chinese patent application No. 202011412419.X, filed on Dec. 4, 2020, the entirety of which is incorporated herein by reference.

FIELD

The present disclosure generally relates to the field of display technology and, more particularly, relates to a pixel driving circuit, a display panel and driving method.

BACKGROUND

An organic light-emitting display device is featured with advantages such as self-illumination, low driving voltage, high luminous efficiency, fast responding speed, thin and light, high contrast, etc., and is considered to be next-generation display device with the most developmental potential. The organic light-emitting display device is more and more widely used in a mobile phone, a computer, a television, a car display device, a wearable device, or any other suitable display device having a display function.

A pixel in the organic light-emitting display device includes a pixel driving circuit. A driving transistor in the pixel driving circuit generates a driving current, and a light-emitting component emits light in response to the driving current. The driving current generated by the driving transistor is related to a potential of a gate of the driving transistor. The gate electrode of the driving transistor is connected to a storage capacitor.

Due to the characteristics of the driving transistor, when the display device switches frames, the driving transistor will be affected by the last frame data, which causes the display screen unable to quickly switch to the preset frame. Thus, an obvious flickering phenomenon will occur, which seriously affects the display effect of the display device. The disclosed pixel driving circuit and driving method, and display panel are directed to solve one or more problems set forth above and other problems.

SUMMARY

One aspect of the present disclosure provides a pixel driving circuit. The pixel driving circuit includes a first power signal terminal and a second power signal terminal. The first power signal terminal receives a first voltage signal, and the second power signal terminal receives a second voltage signal. The pixel driving circuit also includes a driving transistor configured to provide a driving current in a light-emitting stage. A gate of the driving transistor is connected to a first node, a first end of the driving transistor is connected to a second node, and a second end of the driving transistor is connected to a third node. In addition, the pixel driving circuit includes a light-emitting component, connected in series between the driving transistor and the second power signal terminal and configured to emit light in response to the driving current. Moreover, the pixel driving circuit includes a light-emitting controller connected in series between the first power signal terminal and the light-emitting component. A control terminal of the light-emitting controller is connected to a first output terminal of a light-emitting control circuit. Further, the pixel driving circuit includes a bias unit, electrically connected between the third node and a second output terminal of the light-emitting control circuit, and in response to a first control signal, configured to transmit a first signal outputted by the light-emitting control circuit to the third node to adjust a bias state of the driving transistor.

Another aspect of the present disclosure provides a display panel. The display panel includes a pixel driving circuit. The pixel driving circuit includes a first power signal terminal and a second power signal terminal. The first power signal terminal receives a first voltage signal, and the second power signal terminal receives a second voltage signal. The pixel driving circuit also includes a driving transistor configured to provide a driving current in a light-emitting stage. A gate of the driving transistor is connected to a first node, a first end of the driving transistor is connected to a second node, and a second end of the driving transistor is connected to a third node. In addition, the pixel driving circuit includes a light-emitting component, connected in series between the driving transistor and the second power signal terminal and configured to emit light in response to the driving current. Moreover, the pixel driving circuit includes a light-emitting controller connected in series between the first power signal terminal and the light-emitting component. A control terminal of the light-emitting controller is connected to a first output terminal of a light-emitting control circuit. Further, the pixel driving circuit includes a bias unit, electrically connected between the third node and a second output terminal of the light-emitting control circuit, and in response to a first control signal, configured to transmit a first signal outputted by the light-emitting control circuit to the third node to adjust a bias state of the driving transistor.

Another aspect of the present disclosure provides a driving method of a display panel. The driving method includes providing a display panel including a driving transistor, a data writing unit, a compensation unit, a light-emitting controller, a bias unit, and a light-emitting component. The driving transistor is configured to provide a driving current in a light-emitting stage, where a gate of the driving transistor is connected to a first node, a first end of the driving transistor is connected to a second node, and a second end of the driving transistor is connected to a third node. The light-emitting controller is connected in series between the driving transistor and the light-emitting component, where a control terminal of the light-emitting controller is connected to a first output terminal of a light-emitting control circuit. The bias unit is electrically connected between the third node and a second output terminal of the light-emitting control circuit. The driving method also includes in a first bias stage of a driving cycle of the display panel, in response to a first control signal, transmitting, by the bias unit, a first signal outputted by the light-emitting control circuit to the third node to adjust a bias state of the driving transistor. In addition, the driving method includes in a data writing stage of the driving cycle of the display panel, providing, by the data writing unit, a data signal for the driving transistor, and detecting and self-compensating, by the compensation unit, a deviation of a threshold voltage of the driving transistor. Further, the driving method includes in the light-emitting stage of the driving cycle of the display panel, in response to the driving current, emitting light by the light-emitting component.

Other aspects of the present disclosure can be understood by those skilled in the art in light of the description, the claims, and the drawings of the present disclosure.

BRIEF DESCRIPTION OF THE DRAWINGS

To more clearly illustrate the embodiments of the present disclosure, the drawings will be briefly described below. The drawings in the following description are certain embodiments of the present disclosure, and other drawings may be obtained by a person of ordinary skill in the art in view of the drawings provided without creative efforts.

DETAILED DESCRIPTION OF THE DISCLOSURE

Reference will now be made in detail to exemplary embodiments of the disclosure, which are illustrated in the accompanying drawings. Wherever possible, the same reference numbers will be used throughout the drawings to refer to the same or the alike parts. The described embodiments are some but not all of the embodiments of the present disclosure. Based on the disclosed embodiments, persons of ordinary skill in the art may derive other embodiments consistent with the present disclosure, all of which are within the scope of the present disclosure.

The terms used in the disclosed embodiments of the present disclosure are merely for the purpose of describing specific embodiments and are not intended to limit the present disclosure. Similar reference numbers and letters represent similar terms in the following Figures, such that once an item is defined in one Figure, it does not need to be further discussed in subsequent Figures.

Figure 1:
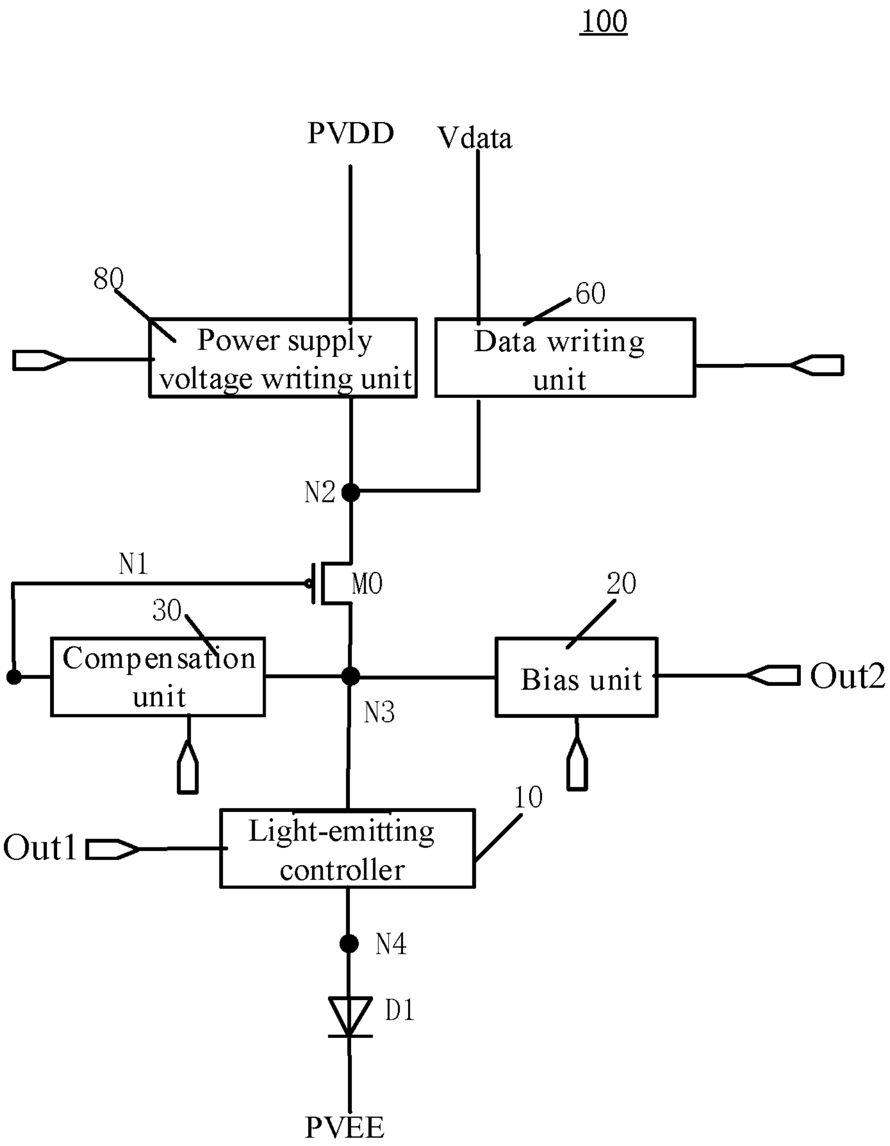
FIG. 1 illustrates a schematic diagram of a frame structure of an exemplary pixel driving circuit consistent with disclosed embodiments of the present disclosure.

The present disclosure provides a pixel driving circuit. FIG. 1 illustrates a schematic diagram of a frame structure of a pixel driving circuit consistent with disclosed embodiments of the present disclosure. Referring to FIG. 1, the pixel driving circuit 100 may include a first power signal terminal PVDD, a second power signal terminal PVEE, a driving transistor M0, a light-emitting component D1, a light-emitting controller 10, and a bias unit 20. The first power signal terminal PVDD may receive a first voltage signal, and the second power signal terminal PVEE may receive a second voltage signal.

The driving transistor M0 may be configured to provide a driving current in a light-emitting stage. A gate of the driving transistor M0 may be connected to a first node N1, a first end of the driving transistor M0 may be connected to a second node N2, and a second end of the driving transistor M0 may be connected to a third node N3.

The light-emitting component D1 may be connected in series between the driving transistor M0 and the second power signal terminal PVEE, and may be configured to emit light in response to the driving current.

The light-emitting controller 10 may be connected in series between the first power signal terminal PVDD and the light-emitting component D1. A control terminal of the light-emitting controller 10 may be connected to a first output terminal Out1 of a light-emitting control circuit.

The bias unit 20 may be electrically connected between the third node N3 and a second output terminal Out2 of the light-emitting control circuit, and in response to a first control signal, may be configured to transmit a first signal outputted by the light-emitting control circuit to the third node N3 to adjust a bias state of the driving transistor M0.

It should be noted that FIG. 1 merely illustrates a frame structure of the pixel driving circuit 100, in certain embodiments, the pixel driving circuit 100 may have any other frame structure, which may not be limited herein.

In one embodiment, the pixel driving circuit 100 may include the driving transistor M0, the light-emitting component D1, and the light-emitting controller 10. The driving transistor M0 may be configured to provide the driving current to the light-emitting component D1 in the light-emitting stage. The light-emitting component D1 may emit light in response to the driving current under the control of the light-emitting controller 10. Further, the pixel driving circuit 100 may include the bias unit 20. A first end of the bias unit 20 may be connected to the third node N3 in the pixel driving circuit 100, a second end of the bias unit 20 may be connected to the second output terminal Out2 of the light-emitting control circuit, and a control terminal of the bias unit 20 may receive the first control signal. The bias unit 20 may be configured to transmit the first signal outputted by the light-emitting control circuit to the third node N3 under the control of the first control signal to adjust the bias state of the driving transistor M0.

Figure 2:
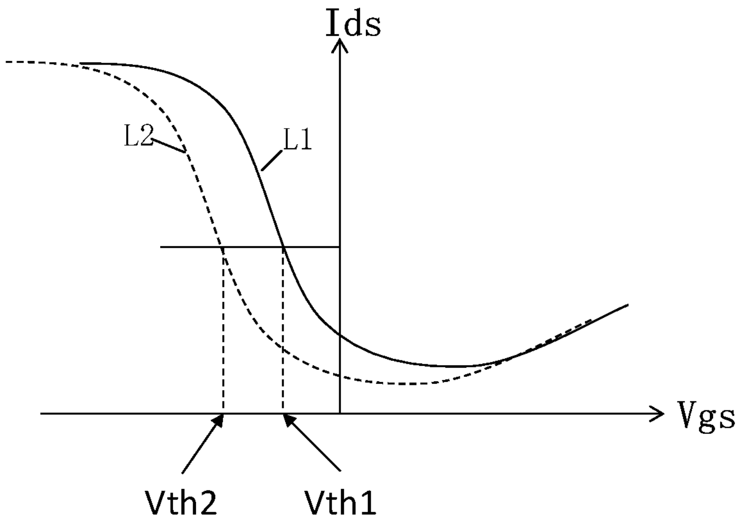
FIG. 2 illustrates characteristic curves of an exemplary driving transistor under different frames consistent with disclosed embodiments of the present disclosure.

FIG. 2 illustrates characteristic curves of a driving transistor under different frames consistent with disclosed embodiments of the present disclosure. For illustrative purposes, the first end of the driving transistor M0 may be a source electrode, the second end of the driving transistor M0 may be a drain electrode, and the control terminal of the driving transistor M0 may be a gate electrode as an example. When the driving circuit performs display periodically, in a non-bias stage such as a non-light-emitting stage, the pixel circuit may be at a situation where the gate potential of the driving transistor M0 is greater than the drain potential of the driving transistor M0. If such situation continues for a long duration, the ions inside the driving transistor M0 may be polarized, which may cause the threshold voltage of the driving transistor M0 to continuously increase and cause the Ids-Vgs curve to be shifted, thereby affecting the driving current flowing into the light-emitting component and the display uniformity.

For example, in a black frame, the characteristic curve corresponding to the driving transistor M0 is L1, and a corresponding threshold voltage is Vth1. In a white frame, the characteristic curve corresponding to the driving transistor M0 is L2, and a corresponding threshold voltage is Vth2. In related technique, when switching the frames, the characteristic curve of the driving transistor M0 may be affected by the last frame data, and a driving current corresponding to the preset to-be-switched frame may not be generated, which may cause the displayed frame not to be quickly switched to the preset to-be-switched frame. For example, before switching from a black frame to a white frame, a gray frame between the black frame and the white frame may appear, and an obvious flickering phenomenon may occur, which may seriously affect the display effect.

In the present disclosure, the bias unit 20 may be introduced to adjust the bias state of the driving transistor M0, to improve the potential difference between the gate potential and the drain potential of the driving transistor M0, to weaken the polarization of ions inside the driving transistor M0, and to reduce the threshold voltage of the driving transistor M0. The threshold voltage of the driving transistor M0 may be adjusted by biasing the driving transistor M0. Therefore, in certain embodiments, in the bias stage, the potential difference between the gate potential and the drain potential of the driving transistor M0 may be adjusted by the bias unit 20. Thus, the internal characteristics of the driving transistor M0 may be changed to balance the influence on the internal characteristics of the driving transistor when the gate potential of the driving transistor M0 is greater than the drain potential of the driving transistor M0 in the non-bias stage. Before switching frames, the bias state of the driving transistor M0 may be adjusted to a fixed bias state, such that the driving transistor may not be affected by the last frame data, and may still generate a driving current corresponding to the preset to-be-switched frame. Therefore, the frame may be quickly switched to the preset to-be-switched frame, which may facilitate to improve the flickering phenomenon occurred when switching the frames and to improve the display effect.

In the present disclosure, before switching frames, when adjusting the bias state of the driving transistor, the bias state of the driving transistor may be adjusted to a negative bias state or a positive bias state.

For illustrative purposes, the driving transistor M0 may be adjusted to the negative bias state as an example, to further illustrate the present disclosure from the perspective of voltage changes of different nodes of the driving transistor M0. The present disclosure may be described by taking the driving transistor M0 as a P-type transistor as an example. In certain embodiments, the driving transistor M0 may be embodied as an N-type transistor, which may not be limited herein. The driving transistor M0 as a P-type transistor may be used as an example. In a black frame, the potential of the first node N1 may be at a high-level, the potential of the second node N2 may be the same as the potential of the first power signal terminal, and the potential of the third node N3 may be zero. In a white frame, the potentials of both the first node N1 and the third node N3 may be zero, and the potential of the second node N2 may be the same as the potential of the first power signal terminal PVDD.

After the driving transistor M0 is reset, the potentials of both the second node N2 and the third node N3 may be at a low-level. When the third node N3 and the second node N2 of the driving transistor M0 are compensated by the bias unit 20, the potentials of both the second node N2 and the third node N3 may become at a high-level, such that the voltage difference between the second node N3 and the first node N1 may become substantially large. When the voltage difference between the second node N3 and the first node N1 becomes substantially large, the internal characteristics of the driving transistor M0 may be changed to balance the influence on the internal characteristics of the driving transistor when the gate potential of the driving transistor M0 is greater than the drain potential of the driving transistor M0 in the non-bias stage. The bias state of the driving transistor may be adjusted to a fixed bias state, such that the driving transistor may not be affected by the last frame data, and may still generate the driving current corresponding to the preset to-be-switched frame. Therefore, the frame may be quickly switched to the preset to-be-switched frame, which may facilitate to improve the flickering phenomenon occurred when switching frames and to improve the display effect.

In addition, in the pixel driving circuit 100 in the present disclosure, after introducing the bias unit 20, the bias unit 20 may be connected to the second output terminal Out2 of the light-emitting control circuit. In other words, the output terminal of the light-emitting control circuit may be directly multiplexed as the signal input terminal of the bias unit 20 without introducing a new signal terminal into the pixel driving circuit 100, which may facilitate to simplify the circuit complexity after introducing the bias unit 20 into the pixel driving circuit 100.

In one embodiment, referring to FIG. 1, the pixel driving circuit 100 may further include a compensation unit 30. The compensation unit 30 may be connected in series between the first node N1 and the third node N3, and may be configured to detect and self-compensate the deviation of the threshold voltage of the driving transistor M0.

Specifically, the compensation unit 30 may be introduced between the first node N1 and the third node N3 of the driving transistor M0. During a data writing stage of the pixel driving circuit 100, a data voltage may be capable of being written into the first node N1 from the third node N3 through the compensation unit 30, to achieve the detection and self-compensation of the deviation of the threshold voltage of the driving transistor M0. Therefore, the value of threshold voltage of the driving transistor M0 may be close to the value of the preset threshold voltage, the generated driving current may be close to the preset driving current, and the light-emitting component D1 may emit light according to the preset brightness, which may facilitate to improve the accuracy of the light-emitting brightness of the light-emitting component D1.

Figure 3:
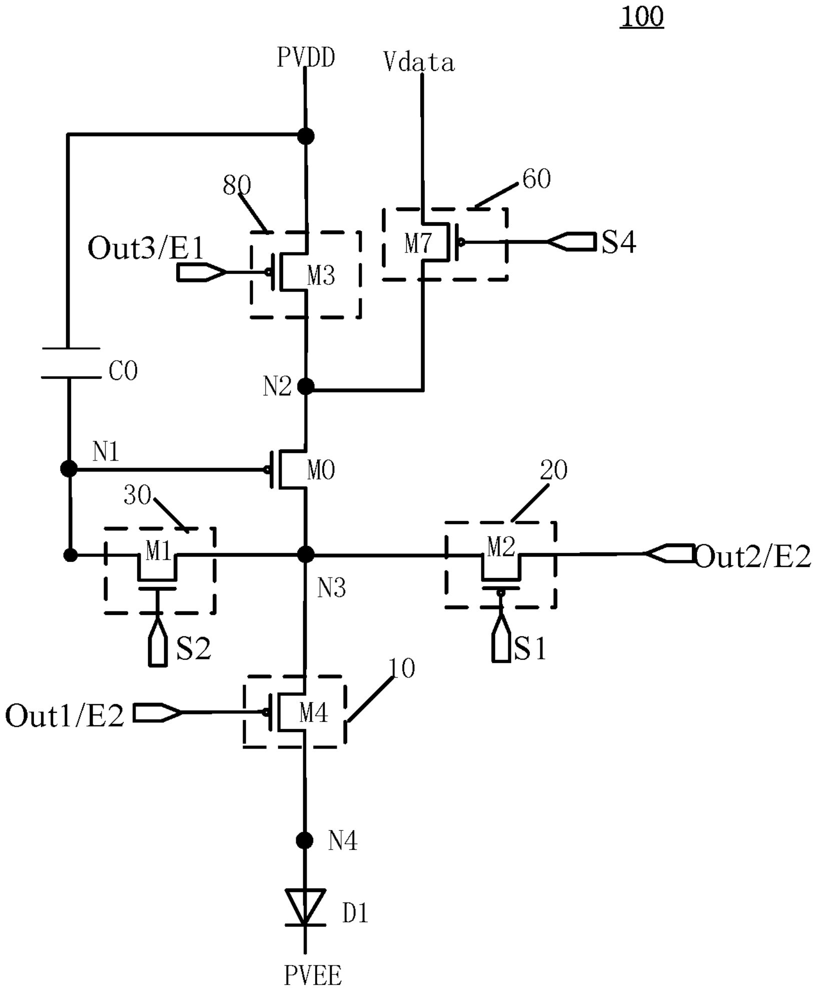
FIG. 3 illustrates a schematic circuit diagram of an exemplary pixel driving circuit consistent with disclosed embodiments of the present disclosure.

FIG. 3 illustrates a schematic circuit diagram of the pixel driving circuit 100 consistent with disclosed embodiments of the present disclosure. In one embodiment, referring to FIG. 3, the compensation unit 30 may include a first transistor M1. A first end of the first transistor M1 may be connected to the first node N1, a second end of the first transistor M1 may be connected to the third node N3, and a control terminal of the first transistor M1 may be connected to a second control signal terminal S2.

Specifically, FIG. 3 illustrates an embodiment in which the compensation unit 30 may include the first transistor M1. The first end and the second end of the first transistor M1 may be connected to the first node N1 and the third node N3 of the driving transistor M0, respectively, and the control terminal of the first transistor M1 may be connected to the second control signal terminal S2. The structure of the compensation unit 30 formed by the first transistor M1 may be substantially simple, and may facilitate to simplify the circuit structure of the pixel driving circuit 100 while performing detection and self-compensation on the threshold voltage of the driving transistor M0.

In one embodiment, referring to FIG. 3, the bias unit 20 may include a second transistor M2. A first end of the second transistor M2 may be connected to the third node N3, a second end of the second transistor M2 may be connected to the second output terminal Out2 of the light-emitting control circuit, and a control terminal of the second transistor M2 may be connected to a first control signal terminal S1.

Specifically, the embodiment associated with FIG. 3 may illustrate a detailed description of the bias unit 20. The bias unit 20 may include a second transistor M2. The control terminal of the second transistor M2 may be connected to the first control signal terminal S1. The first control signal terminal S1 may control the turned-on and turned-off of the second transistor M2. In the bias stage, the second transistor M2 may be controlled to be turned on, and the second output terminal Out2 of the light-emitting control circuit may input the first signal to the third node N3 and the second node N2 of the driving transistor M0. When the driving transistor M0 is a P-type transistor, the first signal may be a high-level signal. When the voltage of the first node N1 of the driving transistor M0 remains unchanged, increasing the voltages of the second node N2 and the third node N3 may be equivalent to increasing the voltage difference between the second node N2 and the first node N1 of the driving transistor M0. Therefore, the internal characteristics of the driving transistor M0 may be changed to balance the influence on the internal characteristics of the driving transistor when the gate potential of the driving transistor M0 is greater than the drain potential of the driving transistor M0 in the non-bias stage. Before switching frames, the driving transistor may maintain a fixed bias state, such that the driving transistor may not be affected by the last frame data, and may still generate the driving current corresponding to the preset to-be-switched frame. Therefore, the frame may be quickly switched to the preset to-be-switched frame, which may facilitate to improve the flickering phenomenon occurred when switching the frames and to improve the display effect.

In one embodiment, referring to FIG. 3, the compensation unit 30 and the bias unit 20 may be multiplexed as a reset unit for the first node N1, and may be configured to reset the first node N1.

Specifically, in the reset stage of the pixel driving circuit 100, the compensation unit 30 and the bias unit 20 may be turned on. In view of this, an output terminal E2 of the light-emitting control circuit connected to the second end of the bias unit 20 may output a low-level signal. The low-level signal may be transmitted to the first node N1 of the driving transistor M0 through the bias unit 20 and the compensation unit 30 to reset the first node N1 of the driving transistor M0. In one embodiment, after introducing the bias unit 20 into the pixel driving circuit 100, the compensation unit 30 and the bias unit 20 may be multiplexed as the reset unit for the first node without introducing a separate reset unit for the first node into the pixel driving circuit 100, which may facilitate to simplify the circuit structure of the pixel driving circuit 100 and to simplify the manufacturing process of the pixel driving circuit 100.

In addition, in one embodiment, because the first node N1 of the driving transistor M0 is electrically connected to a storage capacitor C0 and the first transistor M1, the first node N1 may merely have one leakage path connected to the first transistor M1. Therefore, the leakage path of the first node N1 may be effectively reduced, which may facilitate the maintenance of the potential of the first node N1, and may make the driving current generated by the driving transistor M0 in the light-emitting stage substantially accurate.

In one embodiment, the first transistor M1 may include an oxide transistor. The oxide transistor may have a substantially small off-state leakage current. Because the first transistor M1 is electrically connected to the first node N1 of the driving transistor M0, when the first transistor M1 is selected as an oxide transistor, while reducing the leakage path of the first node N1, the amplitude of the potential change of the first node N1 may be effectively reduced. In other words, the first transistor being the oxide transistor may facilitate to maintain the potential of the first node N1 of the driving transistor M0, such that the driving current generated by the driving transistor M0 may be substantially accurate. When the first transistor M1 is selected as the oxide transistor, the oxide transistor may be turned on in response to a gate at a high-level.

Optionally, in certain embodiments, the first transistor M1 may be a P-type transistor. When the first transistor M1 is selected as a P-type transistor, the P-type transistor may be turned on in response to a gate at a low-level. In other words, when the first transistor M1 is selected as an oxide transistor or a P-type transistor, to achieve the turn-on of the first transistor M1, the signal provided by the second control signal terminal S2 to the first transistor M1 with a different type may be opposite.

In certain embodiments, referring to FIG. 3, the pixel driving circuit 100 may further include a power voltage writing unit 80. The power voltage writing unit 80 may include a third transistor M3. The third transistor M3 may be connected in series between the first power signal terminal PVDD and the second node N2. A control terminal of the third transistor M3 may be electrically connected to a third output terminal Out3 of the light-emitting control circuit.

Specifically, the embodiment associated with FIG. 3 may illustrate a scheme in which the pixel driving circuit 100 may include the power voltage writing unit 80. The power voltage writing unit 80 may be configured to write the first power signal outputted by the first power signal terminal PVDD to the driving transistor M0 during the light-emitting stage. For illustrative purposes, the power voltage writing unit 80 may include the third transistor M3 as an example. The third transistor M3 may be connected in series between the first power signal terminal PVDD and the second node N2. In the light-emitting stage, the third transistor M3 may be turned on, and the first power signal terminal PVDD may transmit the first voltage signal to the driving transistor M0, and the driving transistor M0 may generate a driving current for driving the light-emitting component D1 to emit light.

In an optional embodiment of the present disclosure, the light-emitting control circuit may include a plurality of cascaded light-emitting control circuit units. The third output terminal of the light-emitting control circuit may be multiplexed as the first output terminal of the light-emitting control circuit. In certain embodiments, the third output terminal of the light-emitting control circuit and the first output terminal of the light-emitting control circuit may correspond to output terminals of the light-emitting control circuit units at different levels, respectively.

Specifically, referring to FIG. 3, in one embodiment, the control terminal of the third transistor M3 may be connected to the third output terminal Out3 of the light-emitting control circuit, and the third output terminal may correspond to an output terminal E1 of an $n^{th}$ light-emitting control circuit unit in the light-emitting control circuit. The first output terminal Out1 and the second output terminal Out2 of the light-emitting control circuit may correspond to an output terminal E2 of an $n+1^{th}$ light-emitting control circuit unit in the light-emitting control circuit. In certain embodiments, the first output terminal Out1, the second output terminal Out2, and the third output terminal Out3 of the light-emitting control circuit may correspond to the output terminals of the light-emitting control circuit units at a same level, which may be described in detail in following embodiments.

In an optional embodiment of the present disclosure, referring to FIG. 3, the light-emitting controller may include a fourth transistor M4. The fourth transistor M4 may be connected in series between the light-emitting component D1 and the third node N3. A control terminal of the fourth transistor M4 may be electrically connected to the first output terminal Out1 of the light-emitting control circuit.

Specifically, the fourth transistor M4 may be turned on or turned off under the control of the signal outputted by the first output terminal Out1 of the light-emitting control circuit. In the light-emitting stage, the fourth transistor M4 may be turned on under the control of the signal outputted by the first output terminal Out1 of the light-emitting control circuit, and the driving current generated by the driving transistor M0 may be transmitted to the light-emitting component D1 to control the light-emitting component D1 to emit light.

Optionally, for illustrative purposes, both the third transistor M3 and the fourth transistor M4 may be a P-type transistor as an example. The P-type transistor may be turned on in response to a gate at a low-level. Referring to FIG. 3, in the bias stage, the bias unit 20 may be turned on, the output terminal E2 of the light-emitting control circuit may transmit a high-level signal to the second node N2 and the third node N3 of the driving transistor M0. When the output terminal E2 of the light-emitting control circuit outputs a high-level signal, the control terminal of the fourth transistor M4 may remain off under the control of the high-level signal. In view of this, the output terminal E1 of the light-emitting control circuit connected to the control terminal of the third transistor M3 may output a high-level signal, which may control the third transistor M3 to maintain the off state. In the light-emitting stage, the bias unit 20 may be turned off, and both the output terminal E2 of the light-emitting control circuit electrically connected to the control terminal of the fourth transistor M4 and the output terminal E1 of the light-emitting control circuit electrically connected to the control terminal of the third transistor M3 may output low-level signals, which may control the fourth transistor M4 and the third transistor M3 to be turned on, respectively. Therefore, the signal terminal electrically connected to the second end of the bias unit 20 and the control terminal of the fourth transistor M4 may be multiplexed, which may facilitate to simplify the structure of the pixel driving circuit 100.

In an optional embodiment of the present disclosure, the second output terminal Out2 of the light-emitting control circuit and the first output terminal Out1 of the light-emitting control circuit may be multiplexed. Referring to FIG. 3, both the first output terminal Out1 and the second output terminal Out2 of the light-emitting control circuit may correspond to a same output terminal E2 of the light-emitting control circuit, which may be equivalent to that the same signal output terminal of the light-emitting control circuit may be multiplexed to provide an input signal for the bias unit 20 and a light-emitting control signal for the light-emitting controller 10, which may facilitate to reduce a quantity of signal input terminals in the pixel driving circuit after introducing the bias unit. The scheme of the second output terminal Out2 of the light-emitting control circuit multiplexing the first output terminal Out1 of the light-emitting control circuit may be described in detail in following embodiments.

In an optional embodiment of the present disclosure, the bias unit 20 and the light-emitting controller 10 may be multiplexed as a reset unit for the light-emitting component for resetting the light-emitting component D1.

Specifically, referring to FIG. 3, after introducing the bias unit 20, the bias unit 20 and the light-emitting controller 10 may be multiplexed as the reset unit for the light-emitting component. In the reset stage of the light-emitting component D1, the bias unit 20 may be controlled to be turned on, and the output terminal E2 of the light-emitting control circuit may output a low-level signal. In view of this, the fourth transistor M4 in the light-emitting controller 10 may be turned on, and the low-level signal of the output terminal E2 of the light-emitting control circuit may be transmitted to the fourth node N4. Optionally, the fourth node N4 may correspond to the anode of the light-emitting component D1 to reset the light-emitting component D1. In the present disclosure, the bias unit 20 and the fourth transistor M4 may be multiplexed as the reset unit 50 for the light-emitting component without introducing a separate reset unit for the light-emitting component, thereby facilitating to simplify the structure and manufacturing process of the pixel driving circuit 100.

Figure 4:
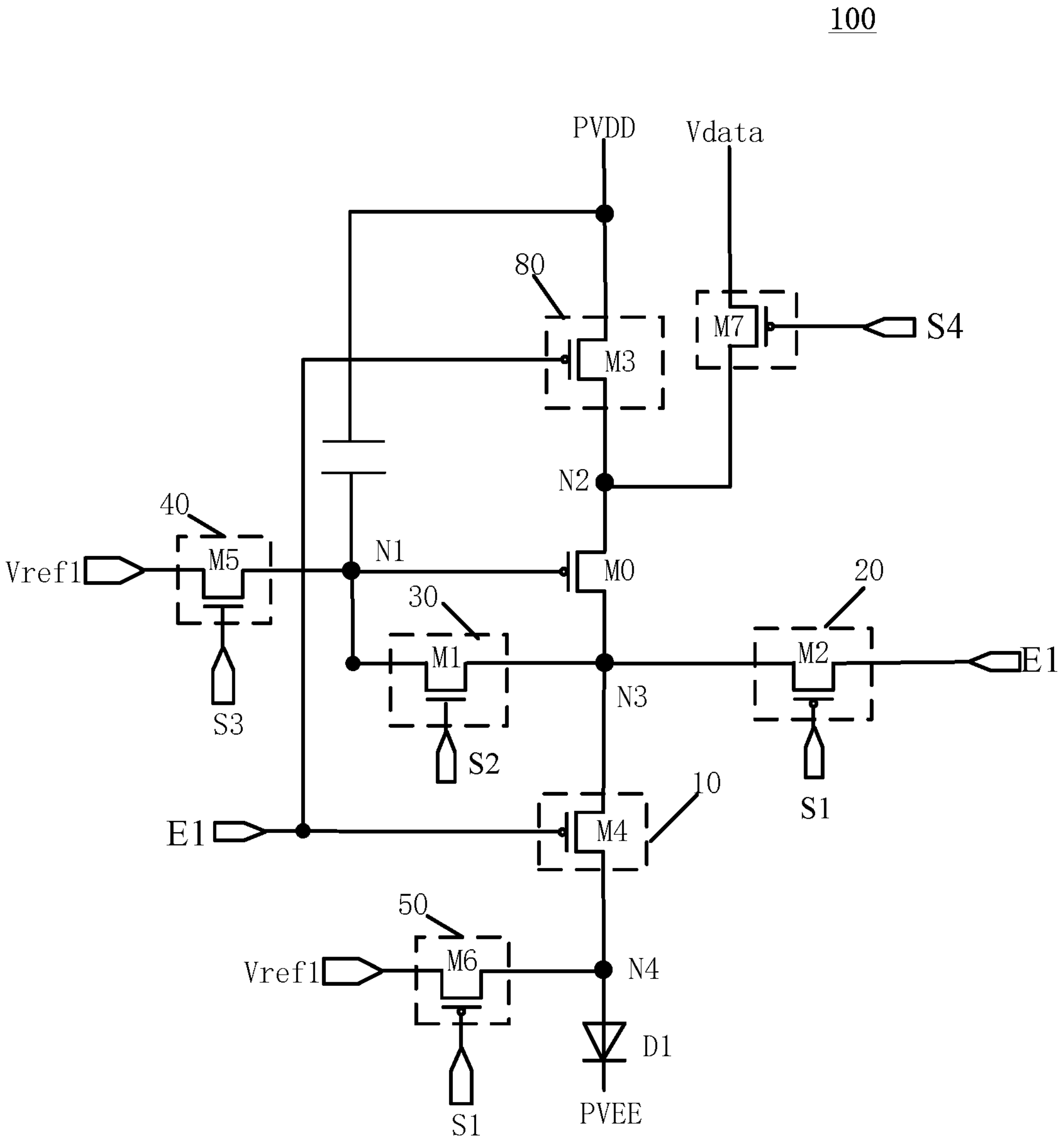
FIG. 4 illustrates a schematic circuit diagram of another exemplary pixel driving circuit consistent with disclosed embodiments of the present disclosure.

FIG. 4 illustrates a schematic circuit diagram of another pixel driving circuit 100 consistent with disclosed embodiments of the present disclosure. Referring to FIG. 4, the arrangement of the bias unit 20 may be the same as the arrangement of the bias unit 20 in the previous embodiment associated with FIG. 3, while the difference may include that the control terminal of the third transistor M3, the control terminal of the fourth transistor M4, and the second end of the bias unit 20 may be connected to the output terminal E1 of the light-emitting control circuit at a same level, and a reset unit 40 for the first node and a reset unit 50 for the light-emitting component may be introduced into the pixel driving circuit 100, which may be described in detail below with reference to FIG. 4.

In an optional embodiment of the present disclosure, referring to FIG. 4, the pixel driving circuit 100 may further include the reset unit 40 for the first node and the reset unit 50 for the light-emitting component. The reset unit 40 for the first node may include a fifth transistor M5, and the reset unit 50 for the light-emitting component may include a sixth transistor M6. A first end of the fifth transistor M5 may be connected to the first node N1, a second end of the fifth transistor M5 may be connected to a first reset signal terminal Vref1, and a control terminal of the fifth transistor M5 may be connected to a third control signal terminal S3. A first end of the sixth transistor M6 may be connected to the first end of the light-emitting component D1, a second end of the sixth transistor M6 may be connected to the first reset signal terminal Vref1, and a control terminal of the sixth transistor M6 may be connected to the first control signal terminal S1. The second end of the light-emitting component D1 may be electrically connected to the second power signal terminal PVEE.

Specifically, in the present disclosure, the reset unit 40 for the first node and the reset unit 50 for the light-emitting component may be introduced into the pixel driving circuit 100. The reset unit 40 for the first node may be configured to reset the first node N1 of the driving transistor M0, and the reset unit 50 for the light-emitting component may be configured to reset the light-emitting component D1. For illustrative purposes, FIG. 4 illustrates that the reset unit 40 for the first node may include the fifth transistor M5, and the reset unit 50 for the light-emitting component may include the sixth transistor M6 as an example. The first end of the fifth transistor M5 may be connected to the first node N1, and the second end of the fifth transistor M5 may be connected to the first reset signal terminal Vref1. The first end of the sixth transistor M6 may be connected to the fourth node N4, and the second end of the sixth transistor M6 may be connected to the first reset signal terminal Vref1. The control terminal of the fifth transistor M5 may be connected to the third control signal terminal S3, and the control terminal of the sixth transistor M6 may be connected to the first control signal terminal S1.

In the reset stage, under the control of the third control signal terminal S3 and the first control signal terminal S1, the fifth transistor M5 and the sixth transistor M6 may be turned on, and a low-level signal of the first reset signal terminal Vref1 may be transmitted to the first node N1 of the driving transistor M0 and the fourth node N4 corresponding to the light-emitting component D1, respectively, to reset the first node N1 and the fourth node N4. In other words, the driving transistor M0 and the light-emitting component D1 may be simultaneously reset. In one embodiment, the signal of the first reset signal terminal Vref1 may be used to reset the first node N1 and the fourth node N4. The signal outputted by the first reset signal terminal Vref1 may be a direct current (DC) signal, which may not be easily interfered by any other signal, thereby facilitating to increase the signal stability of the potential of the first node N1 and the potential of the fourth node N4 after being reset, and facilitating to improve the reset effect.

Optionally, the fifth transistor M5 may be an oxide transistor. The oxide transistor may have a substantially small off-state leakage current. Because the fifth transistor M5 is electrically connected to the first node N1 of the driving transistor M0, when the fifth transistor M5 is selected as the oxide transistor, while reducing the leakage path of the first node N1, the amplitude of the potential change of the first node N1 may be effectively reduced. In other words, the fifth transistor being the oxide transistor may facilitate to maintain the potential of the first node N1 of the driving transistor M0, such that the driving current generated by the driving transistor M0 may be substantially accurate. When the fifth transistor M5 is selected as the oxide transistor, the oxide transistor may be turned on in response to a gate at a high-level.

Optionally, referring to FIG. 4, the control terminal of the third transistor M3, the control terminal of the fourth transistor M4, and the second end of the bias unit 20 may be connected to an output terminal E1 of an $n^{th}$ light-emitting control circuit, where n is an integer greater than or equal to one.

Specifically, in the present disclosure, the control terminal of the third transistor M3, the control terminal of the fourth transistor M4, and the second end of the bias unit 20 may be connected to the output terminal E1 of the light-emitting control circuit at the same level, which may reduce the quantity of the terminals connected with the pixel driving circuit 100. In one embodiment, both the control terminal of the bias unit 20 and the control terminal of the sixth transistor M6 may be connected to the first control signal terminal S1. The control terminal of the fifth transistor M5 corresponding to the reset unit 40 for the first node may be connected to the third control signal terminal S3. The second transistor M2 corresponding to the bias unit 20 and the sixth transistor M6 corresponding to the reset unit 50 for the light-emitting component may be of the same type, and may be simultaneously turned on or turned off under the control of the first control signal terminal S1.

In the bias stage, the second transistor M2, the fifth transistor M5, and the sixth transistor M6 may be controlled to be simultaneously turned on, and the output terminal E1 of the light-emitting control circuit may output a high-level signal. The high-level signal may be transmitted to the second node N2 and the third node N3, such that the third transistor M3 and the fourth transistor M4 may be turned off, and the fifth transistor M5 and the sixth transistor M6 may be turned on. The signal of the first reset signal terminal Vref1 may be transmitted to the first node N1 and the fourth node N4, respectively, to reset the first node N1 and the fourth node N4. The signal outputted by the first reset signal terminal Vref1 may be a DC signal, and the DC signal may not be easily interfered by any other signal. Therefore, while resetting the first node N1 and the fourth node N4 by the first reset signal terminal Vref1, the signal stability of the potential of the first node N1 and the potential of the fourth node N4 after being reset may increase, and the reset effect may be improved.

Figure 5:
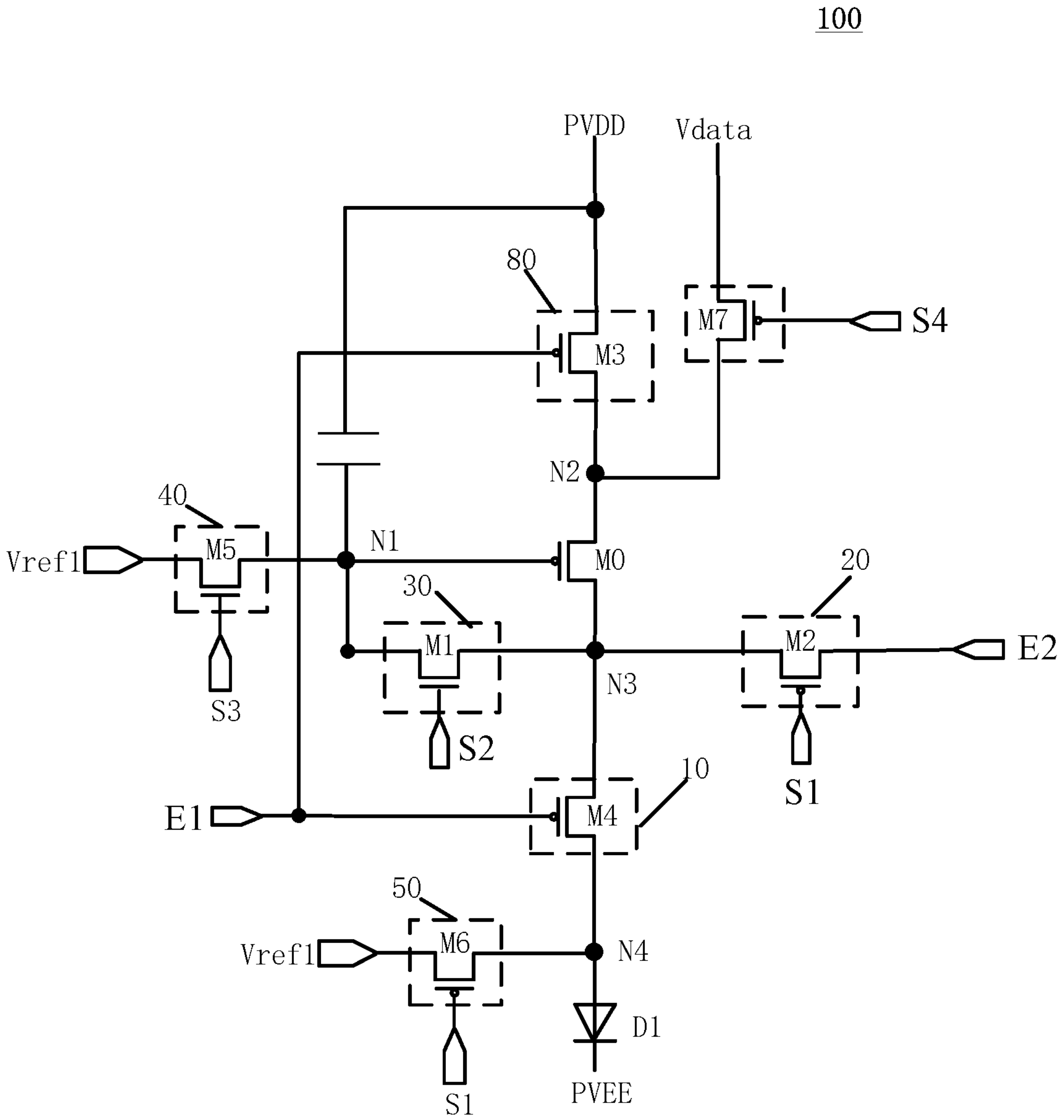
FIG. 5 illustrates a schematic circuit diagram of another exemplary pixel driving circuit consistent with disclosed embodiments of the present disclosure.

FIG. 5 illustrates a schematic circuit diagram of another pixel driving circuit consistent with disclosed embodiments of the present disclosure. For illustrative purposes, the second end of the bias unit 20 and the control terminal of the light-emitting controller 10 may be connected to output terminals of the light-emitting control circuits at different levels, which may be described in detail below.

In an optional embodiment of the present disclosure, referring to FIG. 5, the light-emitting control circuit may include a plurality of cascaded light-emitting control circuit units, and the first output terminal Out1 of the light-emitting control circuit and the second output terminal Out2 of the light-emitting control circuit may correspond to the output terminals of the light-emitting control circuit units at different levels. In the embodiment associated with FIG. 5, both the control terminal of the third transistor M3 and the control terminal of the fourth transistor M4 may be connected to the output terminal E1 of the $n^{th}$ light-emitting control circuit, and the second end of the bias unit 20 may be connected to the output terminal E2 of the $n+1^{th}$ light-emitting control circuit, where n may be an integer greater than or equal to one.

Specifically, in one embodiment, the control terminal of the third transistor M3 and the control terminal of the fourth transistor M4 in the light-emitting controller 10 may be connected to the output terminal E1 of the light-emitting control circuit at the same level (the $n^{th}$ level), and the second end of the bias unit 20 may be connected to the output terminal E2 of the $n+1^{th}$ light-emitting control circuit. In the bias stage, the second transistor M2 may be turned on, and the high-level signal of the output terminal E2 of the light-emitting control circuit may be transmitted to the third node N3 and the second node N2 of the driving transistor M0 to adjust the bias state of the driving transistor M0. The driving transistor M0 may be adjusted to a negative bias state. In view of this, the output terminal E1 of the light-emitting control circuit may be at a high-level, which may control the third transistor M3 and the fourth transistor M4 to maintain the off state.

In one embodiment, the bias stage, the reset stage of the first node N1 and the reset stage of the light-emitting component D1 may be controlled to be performed simultaneously, which may facilitate to simplify the driving timing sequence of the pixel driving circuit 100. In addition, in one embodiment, the signal of the first reset signal terminal Vref1 may be used to reset the first node N1 and the fourth node N4. The signal outputted by the first reset signal terminal Vref1 may be a DC signal, which may not be easily interfered by any other signal, thereby facilitating to increase the signal stability of the potential of the first node N1 and the potential of the fourth node N4 after being reset, and facilitating to improve the reset effect.

Figure 6:
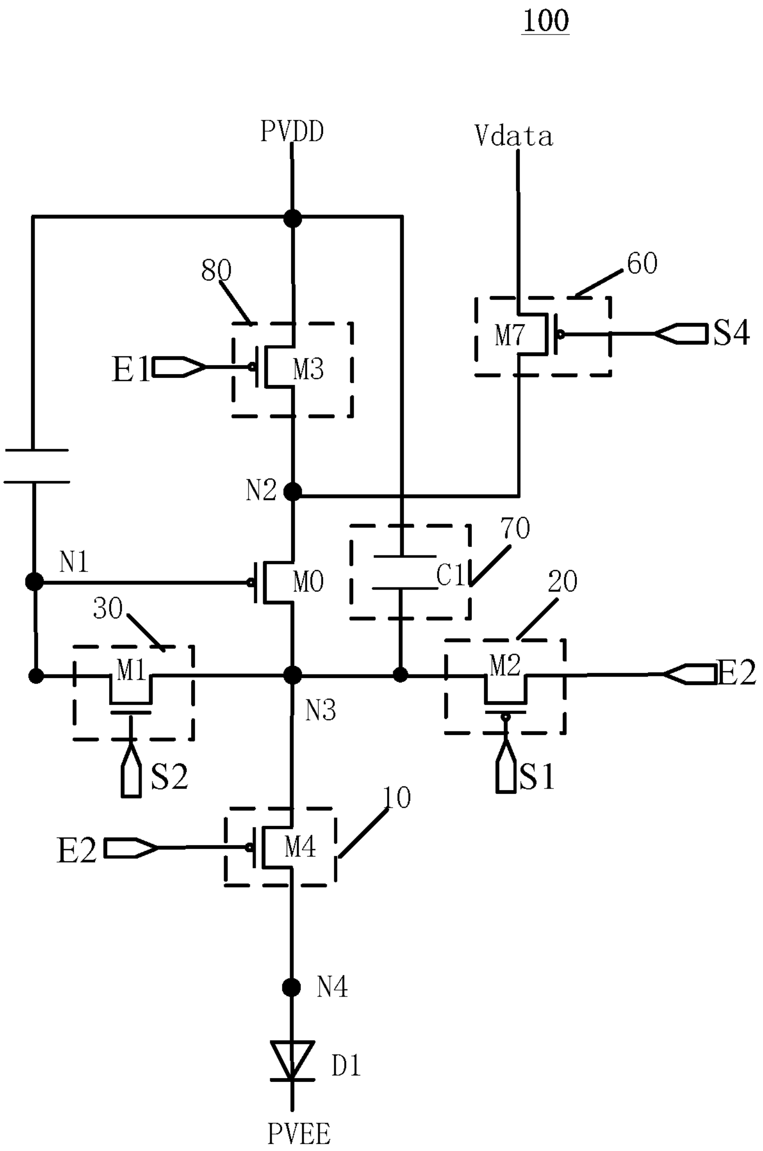
FIG. 6 illustrates a schematic circuit diagram of another exemplary pixel driving circuit consistent with disclosed embodiments of the present disclosure.
Figure 7:
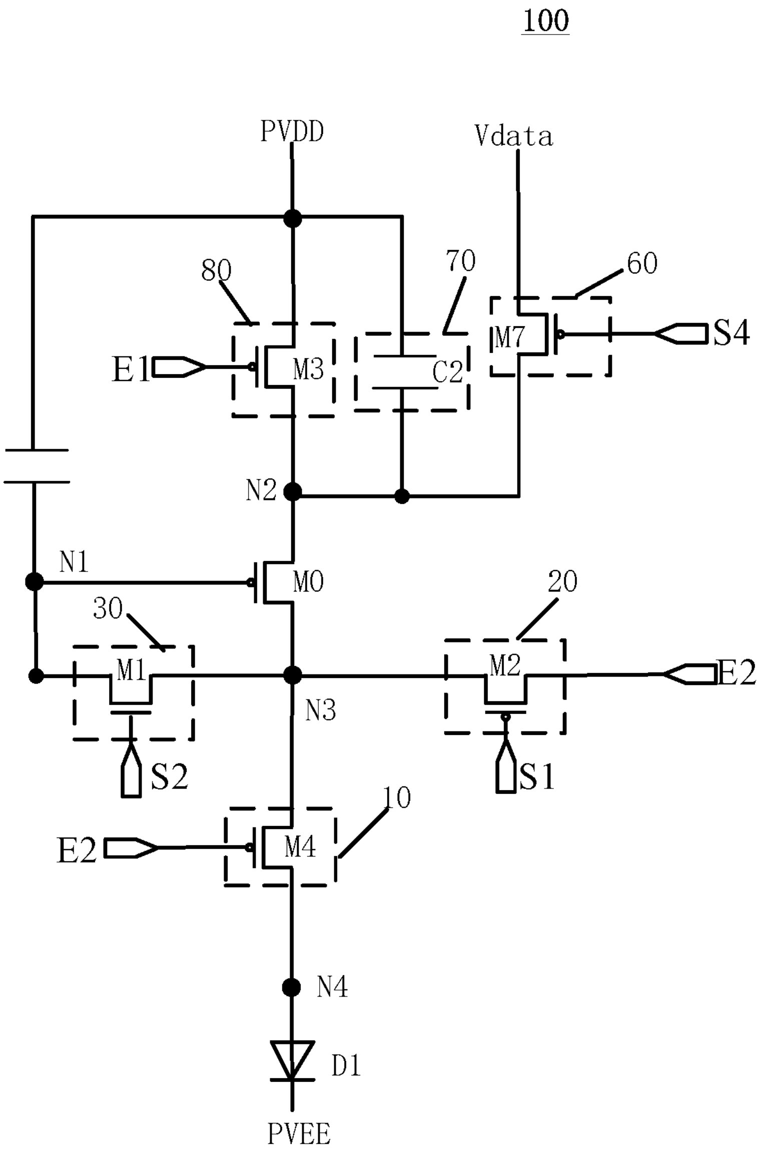
FIG. 7 illustrates a schematic circuit diagram of another exemplary pixel driving circuit consistent with disclosed embodiments of the present disclosure.
Figure 8:
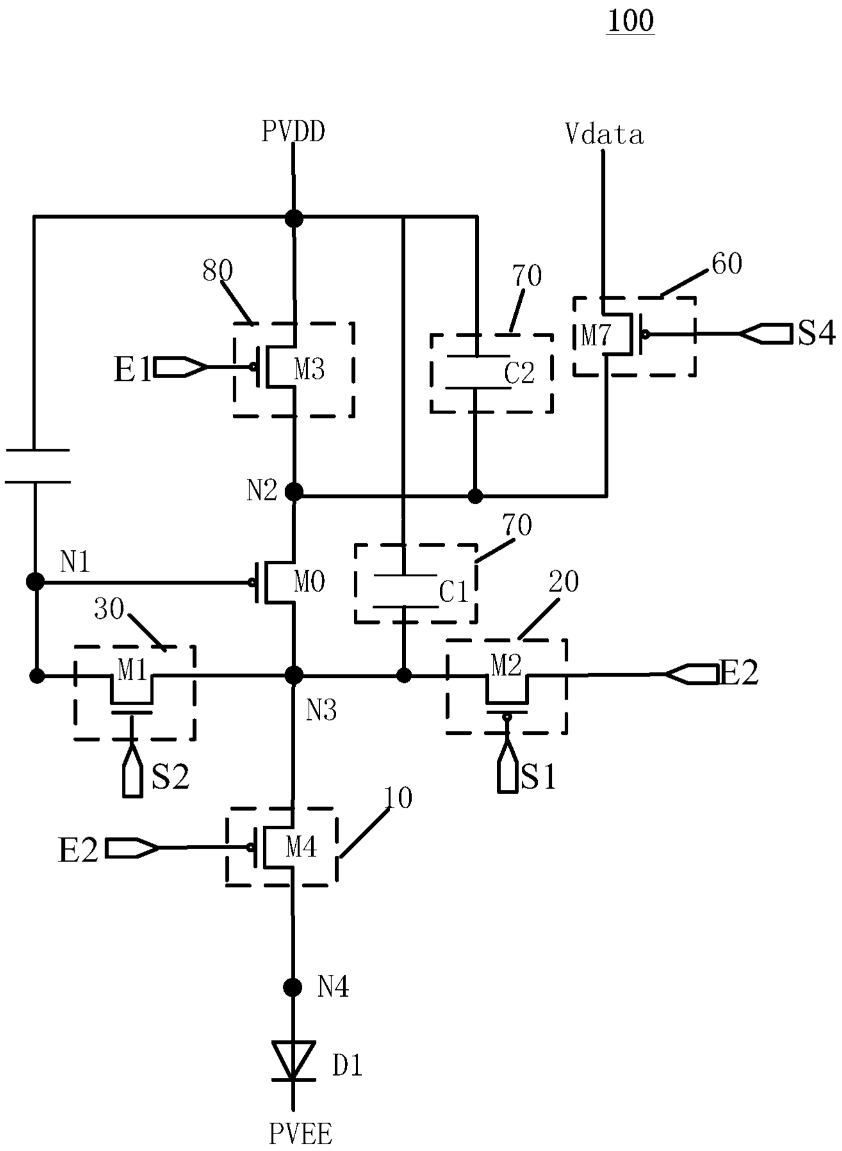
FIG. 8 illustrates a schematic circuit diagram of another exemplary pixel driving circuit consistent with disclosed embodiments of the present disclosure.

FIG. 6 illustrates a schematic circuit diagram of another pixel driving circuit consistent with disclosed embodiments of the present disclosure; FIG. 7 illustrates a schematic circuit diagram of another pixel driving circuit consistent with disclosed embodiments of the present disclosure; and FIG. 8 illustrates a schematic circuit diagram of another pixel driving circuit consistent with disclosed embodiments of the present disclosure. In embodiments associated with FIGS. 6-8, the pixel driving circuit 100 may include a holding unit.

In an optional embodiment of the present disclosure, referring to FIGS. 6-8, the pixel driving circuit 100 may further include a holding unit 70. The holding unit 70 may be connected in series between the first power signal terminal and the bias unit 20, and may be configured to maintain the adjusted bias voltage.

Specifically, before the light-emitting component D1 emits light, the bias unit 20 may be used to adjust the bias state of the driving transistor M0. In other words, the bias state of the driving transistor M0 may be adjusted to a fixed bias state by adjusting the potentials of the second node N2 and the third node N3 of the driving transistor M0. In the present disclosure, the holding unit 70 may be introduced into the pixel driving circuit 100. After adjusting the bias state of the driving transistor M0 and before the light-emitting component D1 emits light, the potentials of the second node N2 and the third node N3 of the driving transistor M0 may be changed. The holding unit 70 introduced in the present disclosure may hold the adjusted potentials of the second node N2 and the third node N3 of the driving transistor M0. In other words, the potential difference between the adjusted gate potential and drain potential of the driving transistor M0 may be maintained, to weaken the polarization of ions inside the driving transistor M0, and to reduce the threshold voltage of the driving transistor M0. Thus, before switching frames, the driving transistor M0 may be maintained at a fixed bias state, such that the driving transistor may not be affected by the last frame data, and may still generate the driving current corresponding to the preset to-be-switched frame. Therefore, the frame may be quickly switched to the preset to-be-switched frame, which may facilitate to improve the flickering phenomenon occurred when switching the frames and to improve the display effect.

The holding unit 70 may be described in detail below with reference to FIGS. 6-8, respectively.

In an optional embodiment of the present disclosure, referring to FIG. 6, the holding unit 70 may include a first capacitor C1. The first capacitor C1 may be connected in series between the first power signal terminal PVDD and the third node N3. The first capacitor C1 may be configured to maintain the potential of the third node N3.

Specifically, the embodiment associated with FIG. 6 may illustrate a case where the first capacitor C1 as the holding unit 70 may be introduced between the first power signal terminal PVDD and the third node N3. Because the voltage signal of the first power signal terminal PVDD connected to one end of the first capacitor C1 is a constant, and the capacitance value of the first capacitor C1 is also a constant, the voltage signal of the third node N3 connected to the other end of the first capacitor C1 may also be a constant. In view of this, the potential of the third node N3 of the driving transistor M0 may be effectively maintained. After resetting the first node N1 of the driving transistor M0, the second node N2 and the third node N3 of the driving transistor M0 may be at a same potential. When the potential of the third node N3 is maintained, the potential of the second node N2 may also be maintained. Therefore, the driving transistor M0 may be maintained at a fixed bias state, and may not be affected by the last frame data. Thus, the introduction of the first capacitor C1 may facilitate to improve the flickering phenomenon caused by the unstable characteristics of the driving transistor, and may facilitate to improve the screen display effect.

In an optional embodiment of the present disclosure, referring to FIG. 7, the holding unit 70 may include a second capacitor C2. The second capacitor C2 may be connected in series between the first power signal terminal PVDD and the second node N2. The second capacitor C2 may be configured to maintain the potential of the second node N2.

Specifically, the embodiment associated with FIG. 7 may illustrate a case where the second capacitor C2 as the holding unit 70 may be introduced between the first power signal terminal PVDD and the second node N2. Because the voltage signal of the first power signal terminal PVDD connected to one end of the second capacitor C2 is a constant, and the capacitance value of the second capacitor C2 is also a constant, the voltage signal of the second node N2 connected to the other end of the second capacitor C2 may also be a constant. In view of this, the potential of the second node N2 of the driving transistor M0 may be effectively maintained. After resetting the first node N1 of the driving transistor M0, the third node N3 and the second node N2 of the driving transistor M0 may be at a same potential. When the potential of the second node N2 is maintained, the potential of the third node N3 may also be maintained. Therefore, the driving transistor M0 may be maintained at a fixed bias state, and may not be affected by the last frame data. Thus, the introduction of the second capacitor C2 may facilitate to improve the flickering phenomenon caused by the unstable characteristics of the driving transistor, and may facilitate to improve the screen display effect.

In an optional embodiment of the present disclosure, referring to FIG. 8, the holding unit 70 may include a first capacitor C1 and a second capacitor C2. The first capacitor C1 may be connected in series between the first power signal terminal PVDD and the third node N3, and the second capacitor C2 may be connected in series between the first power signal terminal PVDD and the second node N2. The first capacitor C1 may be configured to maintain the potential of the third node N3, and the second capacitor C2 may be configured to maintain the potential of the second node N2.

Specifically, the embodiment associated with FIG. 8 may illustrate a case where the first capacitor may be introduced between the first power signal terminal PVDD and the third node N3, and the second capacitor C2 may be introduced between the first power signal terminal PVDD and the second node N2. Because the voltage signal of the first power signal terminal PVDD connected to the first capacitor C1 and the second capacitor C2 is a constant, and the capacitance values of the first capacitor C1 and the second capacitor C2 are also a constant, the first capacitor C1 and the second capacitor C2 may be used to maintain the potential of the third node N3 and the potential of the second node N2. Therefore, the driving transistor M0 may be maintained at a fixed bias state, and may not be affected by the last frame data. Thus, the introduction of the first capacitor C1 and the second capacitor C2 may facilitate to improve the flickering phenomenon caused by the unstable characteristics of the driving transistor, and may facilitate to improve the screen display effect.

In an optional embodiment of the present disclosure, referring to FIG. 1 and FIGS. 3-8, the pixel driving circuit 100 may further include a data writing unit 60. The data writing unit 60 may be configured to write a data signal to the driving transistor M0. In a data writing stage of the pixel driving circuit 100, the data writing unit 60 may be turned on, and the data signal may be written into the driving transistor M0. In the light-emitting stage, the driving transistor M0 may generate a driving current for driving the light-emitting component D1 to emit light according to the data signal and the signal at the first power signal terminal PVDD.

In an optional embodiment of the present disclosure, referring to FIGS. 3-8, the data writing unit 60 may include a seventh transistor M7. The first end and the second end of the seventh transistor M7 may be connected in series between a data signal terminal Vdata and the second node N2, and a control terminal of the seventh transistor M7 may be connected to a fourth control signal terminal S4.

Specifically, FIGS. 3-8 illustrate a scheme where the data writing unit 60 may include the seventh transistor M7. A first end of the seventh transistor M7 may be connected to the data signal terminal Vdata, a second end of the seventh transistor M7 may be connected to the second node N2 of the driving transistor M0, and a control terminal of the seventh transistor M7 may be connected to the fourth control signal terminal S4. The seventh transistor M7 may be turned on or turned off under the control of the signal sent by the fourth control signal terminal S4. In the data writing stage, the seventh transistor M7 may be turned on in response to the low-level signal sent by the fourth control signal terminal S4, and the data signal of the data signal terminal Vdata may be transmitted to the driving transistor M0 through the first transistor M1, thereby writing the data signal.

Figure 9:
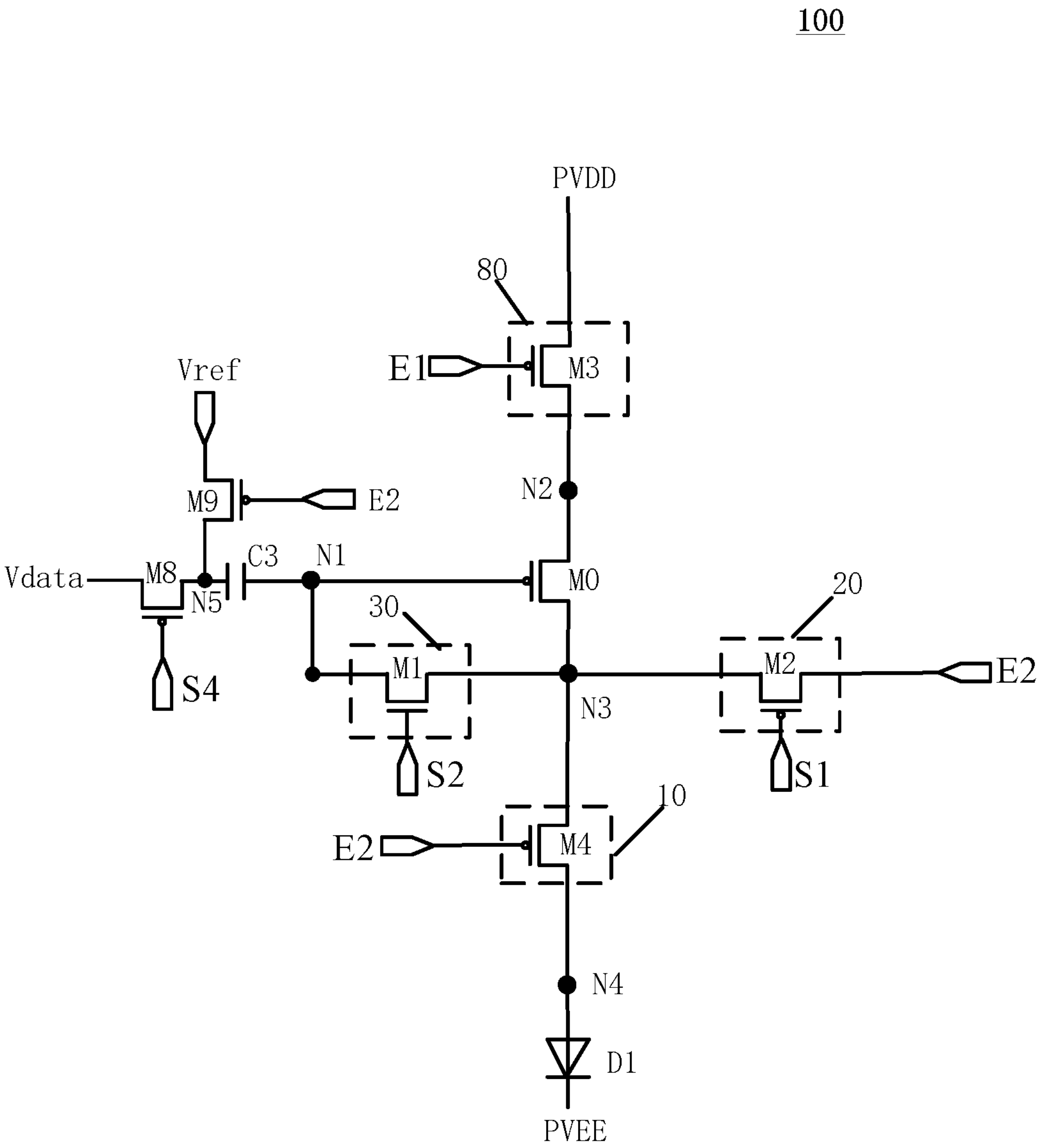
FIG. 9 illustrates a schematic circuit diagram of another exemplary pixel driving circuit consistent with disclosed embodiments of the present disclosure.

FIG. 9 illustrates a schematic circuit diagram of another pixel driving circuit 100 consistent with disclosed embodiments of the present disclosure. The embodiment associated with FIG. 9 may illustrate another implementation manner of the data writing unit 60 in the pixel driving circuit 100.

In an optional embodiment of the present disclosure, referring to FIG. 9, the data writing unit 60 may include an eighth transistor M8, a ninth transistor M9, and a third capacitor C3. A first end of the eighth transistor M8 may be connected to the data signal terminal Vdata, a second end of the eighth transistor M8 may be connected to a first end of the third capacitor C3, a second end of the third capacitor C3 may be connected to the first node N1, and the control terminal of the eighth transistor M8 may be connected to the fourth control signal terminal S4. A first end and a second end of the ninth transistor M9 may be connected in series between an initialization signal terminal Vref and the second end of the eighth transistor M8, and the control terminal of the ninth transistor M9 may be connected to the output terminal E2 of the light-emitting control circuit.

Specifically, in the pixel driving circuit 100 in the embodiment associated with FIG. 9, the second transistor M2 corresponding to the bias unit 20 and the first transistor M1 corresponding to the compensation unit 30 may be multiplexed as the reset unit 40 for the first node. The second transistor M2 and the fourth transistor M4 may be multiplexed as the reset unit 50 for the light-emitting component. The second transistor M2 may be turned on under the control of the first control signal terminal S1, and the first transistor M1 may be turned on under the control of the second control signal terminal S2. The output terminal E2 of the light-emitting control circuit may output a low-level signal, and the low-level signal may be transmitted to the first node N1 to reset the first node N1 of the driving transistor M0. At the same time, a low-level signal outputted by the output terminal E2 of the light-emitting control circuit may control the fourth transistor M4 to be turned on, and the low-level signal may be transmitted to the fourth node N4 through the fourth transistor M4 to reset the light-emitting component D1.

In the bias stage, the second transistor M2 may be turned on, the output terminal E2 of the light-emitting control circuit may output a high-level signal, and the high-level signal may be transmitted to the third node N3 and the second node N2 of the driving transistor M0, to adjust the bias state of the driving transistor M0. The bias state of the driving transistor M0 may be adjusted to a fixed bias state. In the data writing stage, the fourth control signal terminal S4 may control the eighth transistor M8 to be turned on, and the data signal may be transmitted to a fifth node N5 through the eighth transistor M8. The fifth node N5 may be located between the second end of the eighth transistor M8 and the first end of third capacitor C3. At the same time, the output terminal E2 of the light-emitting control circuit may output a low-level signal to control the third transistor to be turned on. The second control signal terminal S2 may output a high-level signal to control the first transistor to be turned on. The signal of the first power signal terminal PVDD may be transmitted to the driving transistor M0 through the third transistor M3, and then may be transmitted from the third node N3 to the first node N1 through the first transistor, to compensate the voltage of the first node N1.

In the light-emitting stage, the output terminals E1 and E2 of the light-emitting control circuit may control the third transistor M3, the fourth transistor M4 and the ninth transistor M9 to be turned on. The low-level signal of the initialization signal terminal Vref may be transmitted to the fifth node N5 to pull down the potential of the fifth node N5. The low potential of the fifth node N5 may be coupled to the first node N1 through the third capacitor C3, to control the driving transistor M0 to be turned on. The driving transistor M0 may generate a driving current according to the voltage of the first power signal terminal PVDD and the voltage of the first node N1. The driving current may be transmitted to the fourth node N4 to drive the light-emitting component D1 to emit light.

Figure 10:
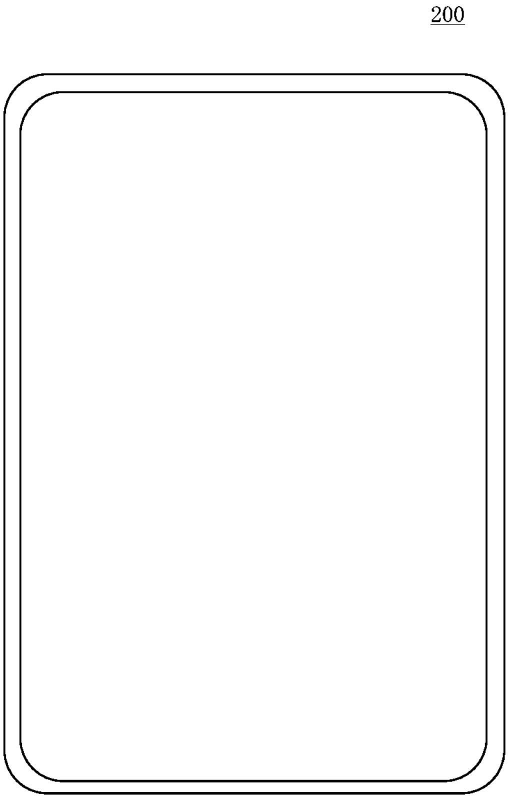
FIG. 10 illustrates a schematic diagram of an exemplary display panel consistent with disclosed embodiments of the present disclosure.

Based on a same concept, the present disclosure also provides a display panel. FIG. 10 illustrates a schematic diagram of a display panel consistent with disclosed embodiments of the present disclosure. The display panel may include the pixel driving circuit provided in the disclosed embodiments of the present disclosure. When the display panel in the present disclosure includes the pixel driving circuit provided in the disclosed embodiments, before switching frames, the bias state of the driving transistor may be adjusted to a fixed bias state, such that the driving transistor may not be affected by the last frame data. Thus, the flickering phenomenon caused by the unstable characteristics of the driving transistor may be improved, and the screen display effect may be improved.

It should be noted that the embodiments of the display panel provided in the present disclosure may refer to the above disclosed embodiments of the pixel driving circuit, and may not be repeated herein. The display panel provided in the present disclosure may be applied to any product or component with real functions such as a mobile phone, a tablet computer, a television, a monitor, a notebook computer, a digital photo frame, a navigator, etc.

Figure 11:
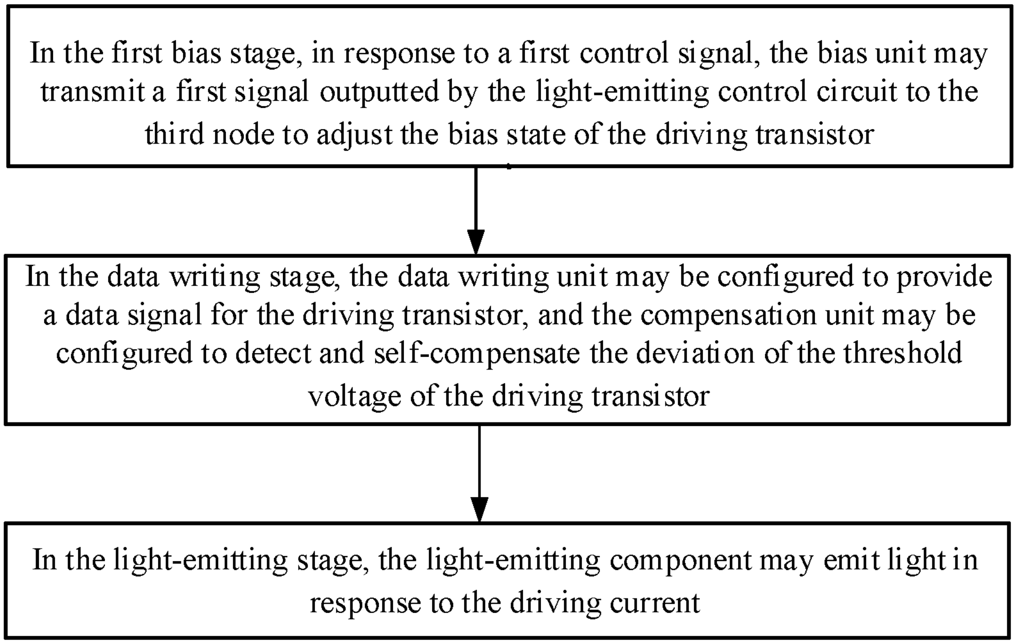
FIG. 11 illustrates a schematic flowchart of an exemplary driving method of a display panel consistent with disclosed embodiments of the present disclosure.

Based on a same concept, the present disclosure also provides a driving method of a display panel. For illustrative purposes, the display panel 200 in the above-disclosed embodiments of the present disclosure may be used as an example. FIG. 11 illustrates a schematic flowchart of a driving method of the display panel 200 consistent with disclosed embodiments of the present disclosure. Referring to FIG. 1 and FIG. 11, the display panel may include a driving transistor M0, a data writing unit 60, a compensation unit 30, a light-emitting controller 10, a bias unit 20, and a light-emitting component D1.

The driving transistor M0 may be configured to provide a driving current in the light-emitting stage. A gate of the driving transistor M0 may be connected to a first node N1, a first end of the driving transistor M0 may be connected to a second node N2, and a second end of the driving transistor M0 may be connected to a third node N3.

The light-emitting controller 10 may be connected in series between the driving transistor M0 and the light-emitting component D1. A control terminal of the light-emitting controller 10 may be connected to a first output terminal Out1 of a light-emitting control circuit.

The bias unit 20 may be electrically connected between the third node N3 and a second output terminal Out2 of the light-emitting control circuit.

A driving cycle of the display panel may include a first bias stage, a data writing stage, and a light-emitting stage. The driving method may include following.

In the first bias stage, in response to a first control signal, the bias unit 20 may transmit a first signal outputted by the light-emitting control circuit to the third node to adjust the bias state of the driving transistor.

In the data writing stage, the data writing unit 60 may be configured to provide a data signal for the driving transistor, and the compensation unit 30 may be configured to detect and self-compensate the deviation of the threshold voltage of the driving transistor M0.

In the light-emitting stage, the light-emitting component D1 may emit light in response to the driving current.

Specifically, in the driving method of the display panel provided by the disclosed embodiments of the present disclosure, the first bias stage may be introduced. In the first bias stage, the bias unit 20 may adjust the bias state of the driving transistor M0. The driving transistor M0 may be adjusted to a fixed bias state to adjust the drain potential of the driving transistor M0, to improve the potential difference between the gate potential and the drain potential of the driving transistor M0, to weaken the polarization of ions inside the driving transistor M0, and to reduce the threshold voltage of the driving transistor M0. Therefore, the threshold voltage of the driving transistor M0 may be adjusted by biasing the driving transistor M0. In view of this, when switching to a following frame, before compensating the threshold voltage of the driving transistor M0, the bias state of the driving transistor M0 may be adjusted to a fixed bias state. Thus, the driving transistor may not be affected by the last frame data when performing compensation, and may generate a driving current corresponding to the preset to-be-switched frame. Therefore, the frame may be quickly switched to the preset to-be-switched frame, which may facilitate to improve the flickering phenomenon occurred when switching the frames and to improve the display effect.

Figure 12:
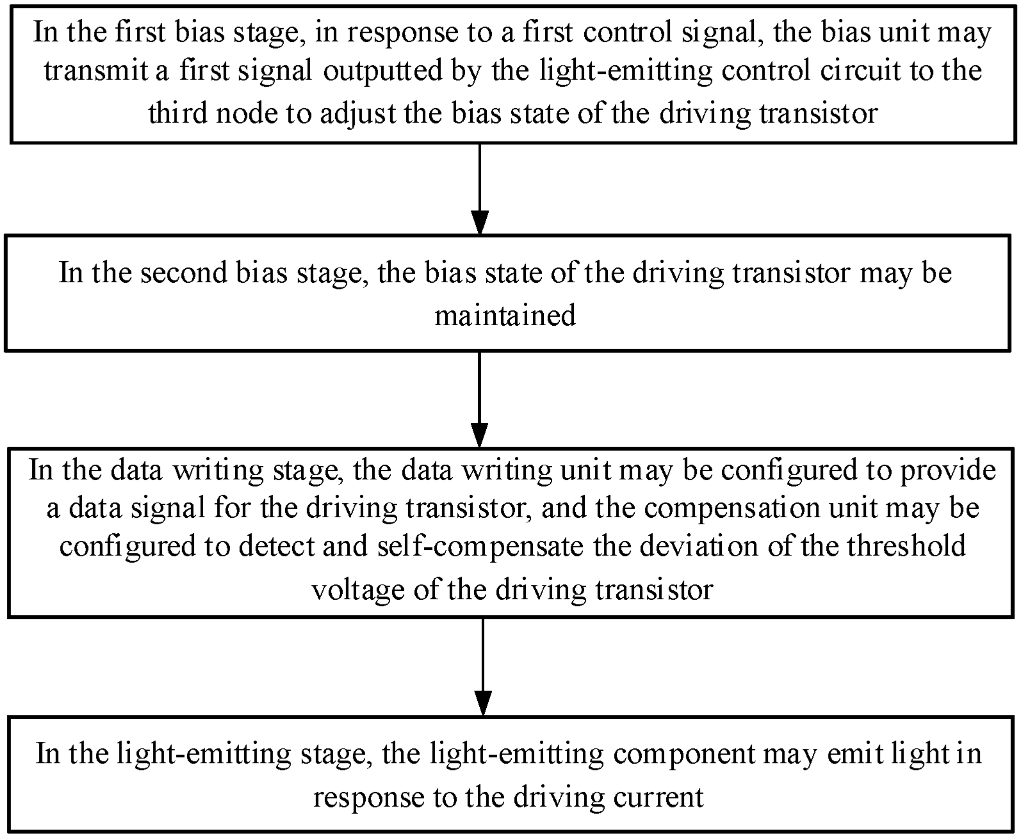
FIG. 12 illustrates a schematic flowchart of another exemplary driving method of a display panel consistent with disclosed embodiments of the present disclosure.

FIG. 12 illustrates a schematic flowchart of another driving method of a display panel consistent with disclosed embodiments of the present disclosure. In an optional embodiment of the present disclosure, referring to FIG. 1 and FIG. 12, the driving method of the pixel driving circuit may further include a second bias stage. The second bias stage may be located after the first bias stage, and may be configured to maintain the bias state of the driving transistor M0.

Specifically, in the present disclosure, the second bias stage may be introduced after the first bias stage. After adjusting the bias state of the driving transistor M0 to a fixed bias state through the first bias stage, the second bias stage may be configured to maintain the bias state of the driving transistor M0, to ensure that after the first bias stage and before the light-emitting stage, the driving transistor M0 may be maintained at the fixed bias state. In other words, the introduction of the second bias stage may be capable of maintaining the fixed bias state of the driving transistor M0 for a duration. Before switching frames, the bias state of the driving transistor M0 may be maintained at the fixed bias state, such that the driving transistor may not be affected by the last frame data, and may still generate a driving current corresponding to the preset to-be-switched frame. Therefore, the frame may be quickly switched to the preset to-be-switched frame, which may facilitate to improve the flickering phenomenon occurred when switching the frames and to improve the display effect.

In an optional embodiment of the present disclosure, the driving method of the pixel driving circuit may further include a reset stage for resetting the first node N1.

The operating process of the pixel driving circuit may be described in detail below with reference to FIG. 3 and FIG.

Figure 13:
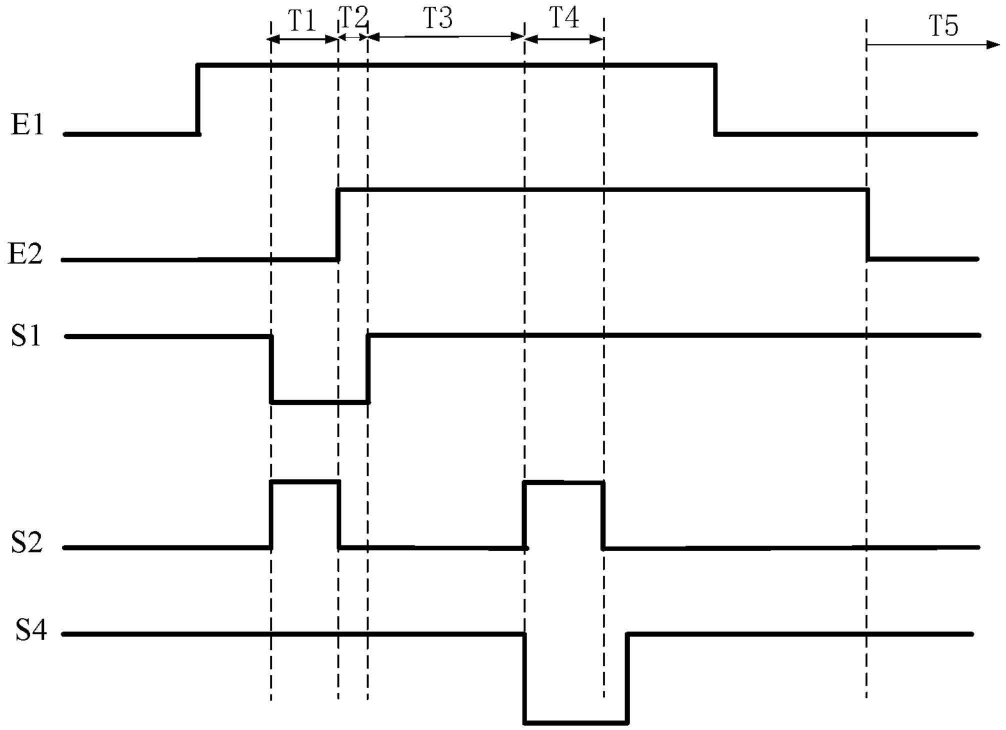
FIG. 13 illustrates an operating timing sequence diagram corresponding to an exemplary pixel driving circuit in FIG. 3 consistent with disclosed embodiments of the present disclosure.

13. FIG. 13 illustrates an operating timing sequence diagram corresponding to the pixel driving circuit in FIG. 3 consistent with disclosed embodiments of the present disclosure, where T1 represents the reset stage, T2 represents the first bias stage, T3 represents the second bias stage, T4 represents the data writing stage, and T5 represents the light-emitting stage. It should be noted that the timing sequence diagrams corresponding to the pixel driving circuits in FIGS. 6-8 may also refer to FIG. 13.

In the reset stage T1, the output terminal E1 of the light-emitting control circuit may be at a high-level, and the third transistor M3 may be turned off. The output terminal E2 of the light-emitting control circuit may be at a low-level, and the fourth transistor M4 may be turned on. The first control signal terminal S1 may be at a low-level, and the second transistor M2 may be turned on. The second control signal terminal S2 may be at a high-level, and the first transistor M1 may be turned on. The low-level signal of the output terminal E2 of the light-emitting control circuit may be transmitted to the first node N1 and the fourth node N4, to reset the driving transistor M0 and the light-emitting component.

In the first bias stage T2, the output terminal E1 of the light-emitting control circuit may be at a high-level, and the third transistor M3 may be turned off. The output terminal E2 of the light-emitting control circuit may be at a high-level, and the fourth transistor M4 may be turned off. The first control signal terminal S1 may be at a low-level, and the second transistor M2 may be turned on. The second control signal terminal S2 may be at a low-level, and the first transistor M1 may be turned off. The high-level signal of the output terminal E2 of the light-emitting control circuit may be transmitted to the third node N3 and the second node N2 of the driving transistor M0, to adjust the driving transistor M0 to a negative bias state.

In the second bias stage T3, the output terminal E1 of the light-emitting control circuit may be maintained at a high-level, and the output terminal E2 of the light-emitting control circuit may be maintained at a high-level. The second node N2 and the third node N3 of the driving transistor M0 may be maintained at a high-level, to enable the driving transistor M0 to be maintained at the negative bias state.

In the data writing stage T4, the output terminals E1 and E2 of the light-emitting control circuit may be maintained at a high-level, and the third transistor M3 and the fourth transistor M4 may be maintained at an off state. The first control signal terminal S1 may be at a high-level, and the second transistor M2 may be turned off. The second control signal terminal S2 may be maintained at a high-level, and the first transistor M1 may be turned on. The fourth control signal terminal S4 may be at a low-level, and the seventh transistor M7 may be turned on. The data signal terminal Vdata may write the data signal into the second node N2 and the third node N3 of the driving transistor M0, and then the data signal may be further transmitted from the third node N3 to the first node N1.

In the light-emitting stage T5, the output terminals E1 and E2 of the light-emitting control circuit may become at a low-level, and the third transistor M3 and the fourth transistor M4 may be turned on. The first control signal terminal S1 may be at a high-level, the second control signal terminal S2 may be at a low-level, and the fourth control signal terminal S4 may be at a high-level. The first transistor M1, the second transistor M2, and the seventh transistor M7 may be turned off. The signal at the first power signal terminal may be transmitted to the driving transistor M0, and the driving transistor M0 may generate a driving current to drive the light-emitting component to emit light.

It should be noted that when the second bias stage is introduced between the first bias stage and the data writing stage, the low-level signal provided by the first control signal terminal S1 in the reset stage T1 and the low-level signal provided by the control signal terminal S4 in the data writing stage T4 may be separated by a certain time interval t, and the time interval t may correspond to a duration for scanning at least one row of sub-pixels in the display panel. When "a" rows of sub-pixels are correspondingly disposed in the display panel, front and back porch time (the sub-pixels may not be scanned in the front and back porch time) may often be set within one frame time. When the front and back porch time is equal to the duration for scanning "b" rows of sub-pixels and the display frequency is f, the one frame time is 1/f, and "a+b" rows of sub-pixels may be scanned in one frame time. In other words, the duration for scanning one row of sub-pixels is H, and $H=(1/f)/(a+b)$. Thus, the above time interval $t \geq (1/f)/(a+b)$.

In view of this, after adjusting the voltages of the second node and the third node of the driving transistor through the first bias stage, the above-mentioned time interval may be used to maintain the potentials of the second node and the third node to ensure that after the first bias stage and before the light-emitting stage, the driving transistor may be maintained at the negative bias state. In other words, the introduction of the above time interval t may maintain the negative bias state of the driving transistor for a period of time. Before switching frames, the bias state of the driving transistor M0 may be maintained at the fixed negative bias state. Therefore, the driving transistor may not be affected by the last frame data, and may still generate a driving current corresponding to the preset to-be-switched frame. Thus, the frame may be quickly switched to the preset to-be-switched frame, which may facilitate to improve the flickering phenomenon occurred when switching the frames and to improve the display effect. It should be noted that the second bias stage in the present disclosure may fall within the time range of the aforementioned time interval t.

In an optional embodiment of the present disclosure, referring to FIG. 3 and FIG. 13, in a same driving cycle, the reset stage may be performed before the data writing stage, and the first bias stage T2 may be located between the reset stage T1 and the data writing stage T4. In other words, the first bias stage T2 may be located between the reset stage T1 and the data writing stage T4. The first bias stage T1 may be introduced before the data writing stage T4, to adjust the bias state of the driving transistor M0, to adjust the drain potential of the driving transistor M0, to improve the potential difference between the gate potential and the drain potential of the driving transistor M0, to weaken the polarization of ions inside the driving transistor M0, and to reduce the threshold voltage of the driving transistor M0. Therefore, the threshold voltage of the driving transistor M0 may be adjusted by biasing the driving transistor M0, to adjust the driving transistor M0 to the fixed negative bias state. Thus, the driving transistor may not be affected by the last frame data, and may still generate the driving current corresponding to the preset to-be-switched frame. Therefore, the frame may be quickly switched to the preset to-be-switched frame, which may facilitate to improve the flickering phenomenon occurred when switching the frames and to improve the display effect.

In an optional embodiment of the present disclosure, referring to FIG. 3 and FIG. 13, the compensation unit 30 and the bias unit 20 may be multiplexed as the reset unit for the first node N1, and the bias unit 20 and the fourth transistor M4 in the light-emitting controller may be multiplexed as the reset unit for the light-emitting component.

In the reset stage, the bias unit 20, the compensation unit 30, and the fourth transistor M4 in the light-emitting controller may be turned on, and the second end of the bias unit 20 may output a reset signal to the first node N1 and the fourth node N4, respectively.

In the first bias stage T2, the compensation unit 30 and the light-emitting controller 10 may be turned off, the bias unit 20 may be turned on, and the second end of the bias unit 20 may output a first signal to the third node N3 and the second node N2.

Specifically, in one embodiment, the second transistor M2 in the bias unit 20 and the first transistor M1 in the compensation unit 30 may be multiplexed as the reset unit for the first node, and the second transistor M2 in the bias unit 20 and the fourth transistor M4 in the light-emitting controller 10 may be multiplexed as the reset unit for the light-emitting component. The resetting of the first node N1 and the resetting of the light-emitting component may be simultaneously achieved in the reset stage T1, which may facilitate to simplify the control timing sequence of the pixel driving circuit. In addition, the multiplexing of the reset unit for the first node N1 and the reset unit for the light-emitting component may avoid introducing a separate reset unit in the pixel driving circuit, which may facilitate to simplify the circuit structure of the pixel driving circuit.

It should be noted that because the bias unit 20 and the first transistor M1 are multiplexed as the reset unit for the first node N1, the bias unit 20 and the fourth transistor M4 are multiplexed as the reset unit for the light-emitting component, in the reset stage T1, the signal transmitted by the output terminal E2 of the light-emitting control circuit connected to the bias unit 20 may be a low-level signal; and in the first bias stage, the signal transmitted by the output terminal E2 of the light-emitting control circuit connected to the bias unit 20 may be a high-level signal.

Figure 14:
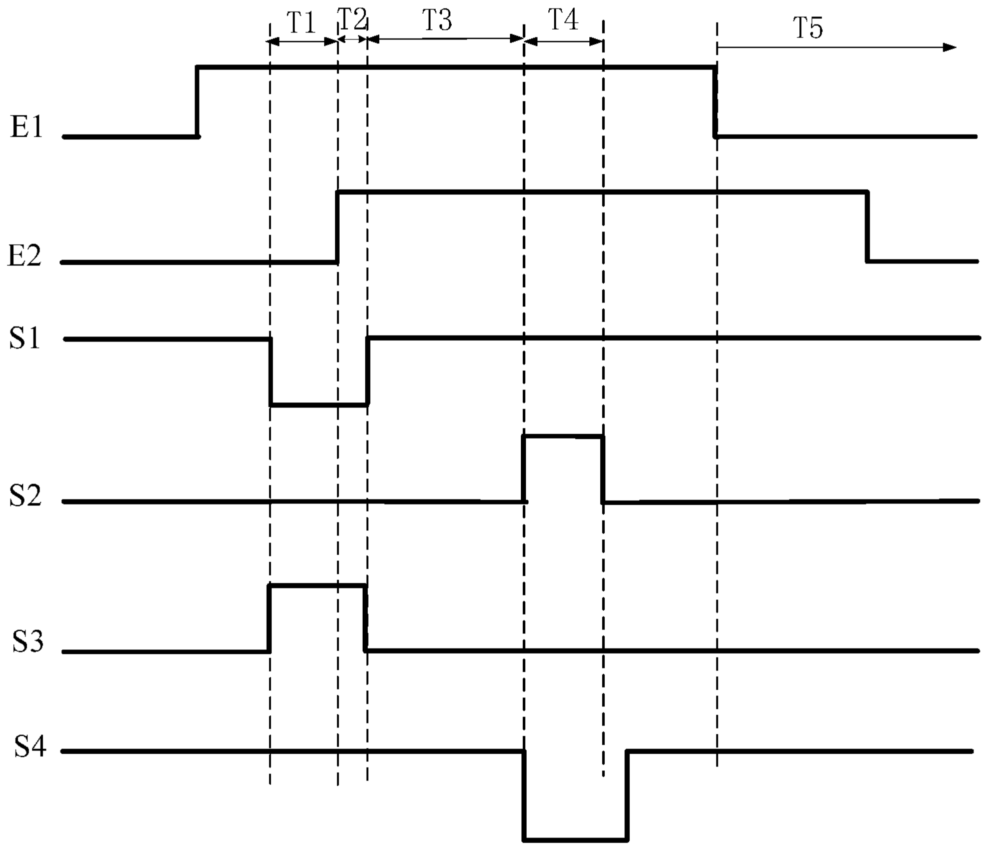
FIG. 14 illustrates an operating timing sequence diagram corresponding to an exemplary pixel driving circuit in FIG. 5 consistent with disclosed embodiments of the present disclosure.

FIG. 14 illustrates an operating timing sequence diagram corresponding to the pixel driving circuit in FIG. 5 consistent with disclosed embodiments of the present disclosure. FIG. 5 and FIG. 14 illustrate a scheme where the first bias stage may be located between the reset stage and the data writing stage, where T1 represents the reset stage, T2 represents the first bias stage, T3 represents the second bias stage, T4 represents the data writing stage, and T5 represents the light-emitting stage. The operating process of the pixel driving circuit in FIG. 5 may be described in detail below with reference to FIG. 5 and FIG. 14.

In the reset stage T1, the output terminal E1 of the light-emitting control circuit may be at a high-level, the output terminal E2 of the light-emitting control circuit may be at a low-level, and the third transistor M3 and the fourth transistor M4 may be turned off. The second control signal terminal S2 may be at a low-level, and the first transistor M1 may be turned off. The first control signal terminal S1 may be at a low-level, and the sixth transistor M6 and the second transistor M2 may be turned on. The third control signal terminal S3 may be at a high-level, and the fifth transistor M5 may be turned on. The low-level signal of the first reset signal terminal may be transmitted to the first node N1 and the fourth node N4, to reset the driving transistor M0 and the light-emitting component D1, respectively.

In the first bias stage T2, the output terminal E1 of the light-emitting control circuit may be at a high-level, and the third transistor M3 and the fourth transistor M4 may be turned off. The output terminal E2 of the light-emitting control circuit may become at a high-level, and the high-level signal may be transmitted to the second node N2 and the third node N3 of the driving transistor M0, to adjust the driving transistor M0 to be at a fixed bias stage, e.g., a negative bias state.

In the second bias stage T3, the output terminal E1 of the light-emitting control circuit may be maintained at a high-level, and the output terminal E2 of the light-emitting control circuit may be maintained at a high-level. The second node N2 and the third node N3 of the driving transistor M0 may be maintained at a high-level, to enable the driving transistor M0 to be maintained at the negative bias state.

In the data writing stage T4, the output terminal E1 of the light-emitting control circuit may be maintained at a high-level, and the third transistor M3 and the fourth transistor M4 may be maintained at an off state. The first control signal terminal S1 may be at a high-level, and the second transistor M2 may be turned off. The second control signal terminal S2 may be at a high-level, and the first transistor M1 may be turned on. The fourth control signal terminal S4 may be at a low-level, and the seventh transistor M7 may be turned on. The data signal terminal Vdata may write the data signal into the second node N2 and the third node N3 of the driving transistor M0, and then the data signal may be further transmitted from the third node N3 to the first node N1.

In the light-emitting stage T5, the output terminal E1 of the light-emitting control circuit may become at a low-level, and the third transistor M3 and the fourth transistor M4 may be turned on. The first control signal terminal S1 may be at a high-level, the second control signal terminal S2 may be at a low-level, and the fourth control signal terminal S4 may be at a high-level. The first transistor M1, the second transistor M2, and the seventh transistor M7 may be turned off. The signal at the first power signal terminal PVDD may be transmitted to the driving transistor M0, and the driving transistor M0 may generate a driving current to drive the light-emitting component D1 to emit light.

In an optional embodiment of the present disclosure, referring to FIG. 5 and FIG. 14, in the reset stage T1, the reset unit 40 for the first node and the reset unit 50 for the light-emitting component may be turned on. The first reset signal terminal Vref1 may output a reset signal to the first node N1 and the light-emitting component, respectively. In the first bias stage, the bias unit 20 may be turned on, the reset unit 40 for the first node and the reset unit 50 for the light-emitting component may be turned off, and the bias unit 20 may output a first signal to the third node N3 and the second node N2, respectively.

In the embodiments associated with FIG. 5 and FIG. 14, the reset stage T1 may be performed before the first bias stage T2. The reset unit 40 for the first node and the reset unit 50 for the light-emitting component may correspond to a same first reset signal terminal Vref1. Because the signal outputted by the first reset signal terminal Vref1 is a DC signal and the DC signal is not easily interfered by any other signal, the first node N1 and the fourth node N4 may be reset by the signal of the first reset signal terminal Vref1, which may facilitate to increase the signal stability of the potential of the first node N1 and the potential of the fourth node N4 after being reset, and may facilitate to improve the reset effect.

Figure 15:
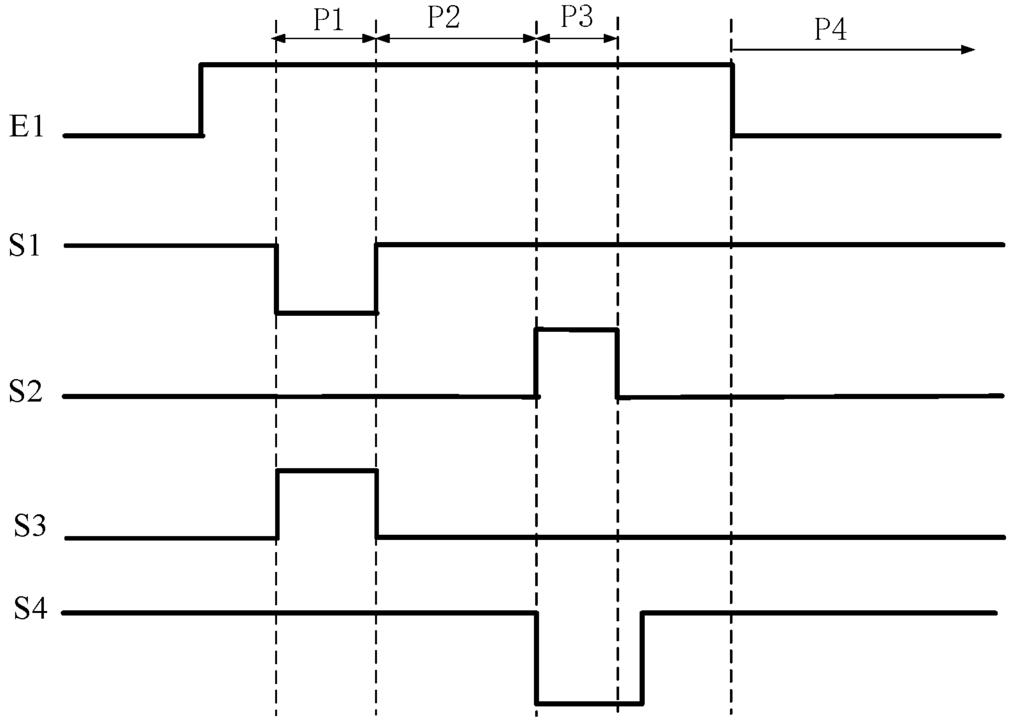
FIG. 15 illustrates an operating timing sequence diagram corresponding to an exemplary pixel driving circuit in FIG. 4 consistent with disclosed embodiments of the present disclosure.

FIG. 15 illustrates an operating timing sequence diagram corresponding to the pixel driving circuit in FIG. 4 consistent with disclosed embodiments of the present disclosure. FIG. 4 and FIG. 15 illustrate a scheme where the first bias stage and the reset stage may be simultaneously performed, where P1 represents the reset stage and the first bias stage, P2 represents the second bias stage, P3 represents the data writing stage, and P4 represents the light-emitting stage. The operating process of the pixel driving circuit in FIG. 4 may be described in detail below with reference to FIG. 4 and FIG. 15.

In an optional embodiment of the present disclosure, in the same driving cycle, the first bias stage and the reset stage may be performed simultaneously without introducing different timing sequences for the first bias stage and the reset stage, respectively, which may facilitate to simplify the driving timing sequence of the pixel driving circuit. In addition, the first bias stage and the reset stage may be performed simultaneously, which may be equivalent to adjusting the bias state of the driving transistor at the time of reset. Compared with the method of performing the first bias stage after the reset stage, the duration of the first bias stage may be extended, such that the bias state of the driving transistor may be maintained for a substantially long duration. In other words, the duration for maintaining the potential difference between the gate potential and the drain potential of the adjusted driving transistor may be substantially long, which may facilitate to weaken the polarization of ions inside the driving transistor, and to reduce the threshold voltage of the driving transistor. Therefore, the flickering phenomenon and poor display effect caused by the hysteresis effect of the driving transistor in the low-frequency display mode may be improved.

Referring to FIG. 4 and FIG. 15, in the reset stage and the first bias state P1, the first control signal terminal S1 may be at a low-level, and the second transistor M2 and the sixth transistor M6 may be turned on. The third control signal terminal S3 may be at a high-level, and the fifth transistor M5 may be turned on. The output terminal E1 of the light-emitting control circuit may be at a high-level, and the third transistor M3 and the fourth transistor M4 may be turned off. The second control signal terminal S2 may be at a low-level, and the first transistor M1 may be turned off. The low-level signal of the first reset signal terminal Vref1 may be transmitted to the first node N1 and the fourth node N4, respectively, and the high-level signal of the output terminal E1 of the light-emitting control circuit may be transmitted to the second node N2 and the third node N3, to adjust the driving transistor M0 to be at a negative bias state.

In other words, in the first bias stage, both the bias unit 20 and the reset unit 40 for the first node may be turned on, and the second end of the bias unit 20 may output a first signal, i.e., a bias signal, to the third node N3 and the second node N2, respectively, and at the same time, the first reset signal terminal Vref1 may output the reset signal to the first node N1 and the fourth node N4, respectively, which may facilitate to simplify the driving timing sequence of the pixel driving circuit. At the same time, because the signal outputted by the first reset signal terminal Vref1 is a DC signal and the DC signal is not easily interfered by any other signal, the first node N1 and the fourth node N4 may be reset by the signal of the first reset signal terminal Vref1, which may facilitate to increase the signal stability of the potential of the first node N1 and the potential of the fourth node N4 after being reset, and may facilitate to improve the reset effect.

In the second bias stage P2, the output terminal E1 of the light-emitting control circuit may be maintained at a high-level, and the second node N2 and the third node N3 of the driving transistor M0 may be maintained at a high-level, to enable the driving transistor M0 to be maintained at the negative bias state.

In the data writing stage P3, the output terminal E1 of the light-emitting control circuit may be maintained at a high-level, and the third transistor M3 and the fourth transistor M4 may be maintained at an off state. The first control signal terminal S1 may be at a high-level, and the second transistor M2 may be turned off. The second control signal terminal S2 may be at a high-level, and the first transistor M1 may be turned on. The fourth control signal terminal S4 may be at a low-level, and the seventh transistor M7 may be turned on. The data signal terminal Vdata may write the data signal into the second node N2 and the third node N3 of the driving transistor M0, and then the data signal may be further transmitted from the third node N3 to the first node N1.

In the light-emitting stage P4, the output terminal E1 of the light-emitting control circuit may become at a low-level, and the third transistor M3 and the fourth transistor M4 may be turned on. The first control signal terminal S1 may be at a high-level, the second control signal terminal S2 may be at a low-level, and the fourth control signal terminal S4 may be at a high-level. The first transistor M1, the second transistor M2, and the seventh transistor M7 may be turned off. The signal at the first power signal terminal may be transmitted to the driving transistor M0, and the driving transistor M0 may generate a driving current to drive the light-emitting component to emit light.

Optionally, in the embodiments associated with FIGS. 13-15, the first control signal terminal S1 and the fourth control signal terminal S4 may be multiplexed as a same signal terminal. In view of this, adjacent two low-level signals outputted by the same signal terminal may be separated by a certain time interval, and such time interval may set aside sufficient period of time for the second bias stage. Therefore, the bias state of the driving transistor M0 may be maintained for a substantially long duration, to ensure that the driving transistor M0 may be maintained at the fixed bias state before the data writing stage. Thus, the driving transistor M0 may be prevented from being affected by the last frame data, and may generate a driving current same or nearly same as the preset driving current in the current frame, which may avoid the screen flickering or screen shaking phenomena when switching between different frames, and may facilitate to improve the screen display effect.

It should be noted that FIGS. 13-15 illustrate embodiments in which the bias state of the driving transistor may be adjusted to the negative bias state. In certain embodiments, the bias state of the driving transistor may be adjusted to a positive bias state. When adjusting the bias state of the driving transistor to the positive bias state, optionally, in a same driving cycle, the first bias stage may be performed before the reset stage. The method for adjusting the bias state of the driving transistor to the positive bias state may be described in detail below with reference to FIGS. 16-17 and FIGS. 18-19.

Figure 16:
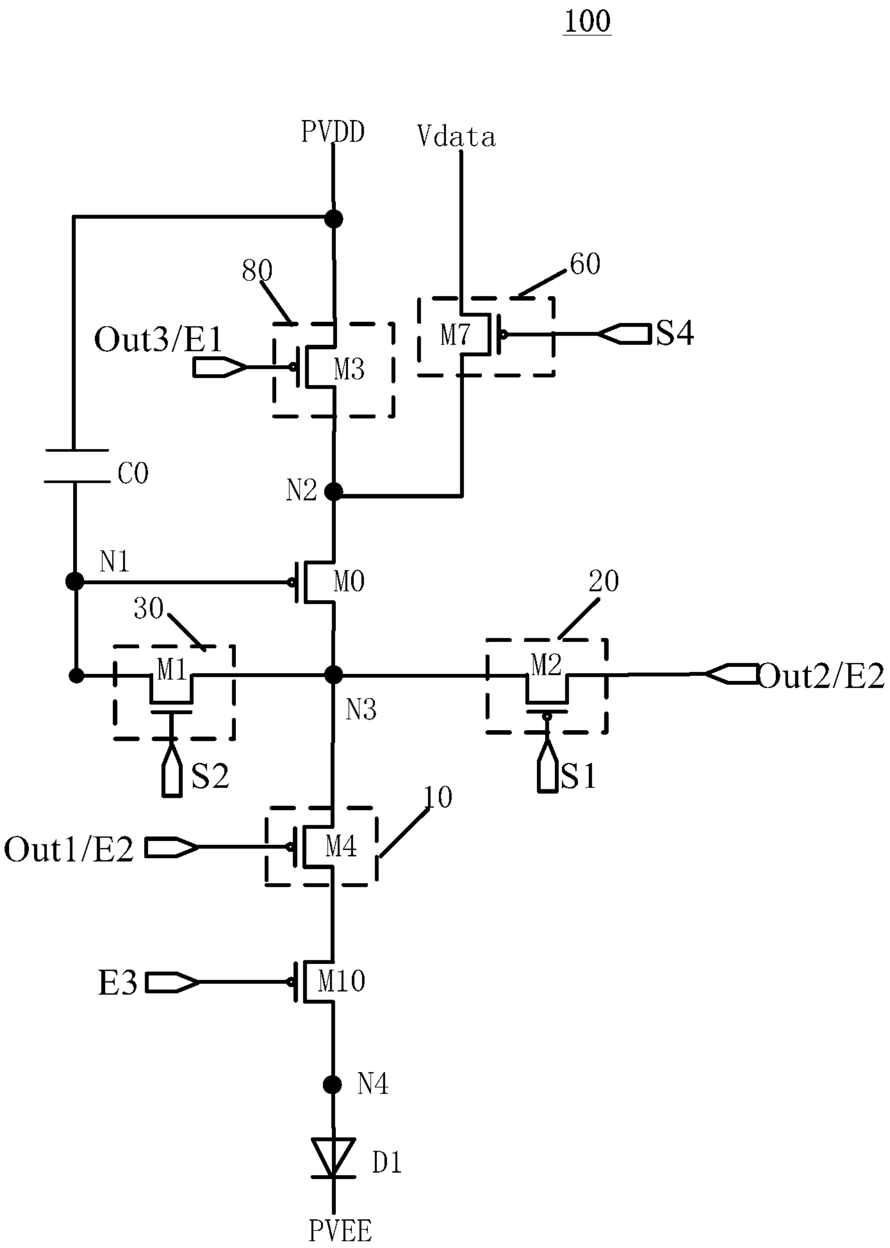
FIG. 16 illustrates a schematic circuit diagram of another exemplary pixel driving circuit consistent with disclosed embodiments of the present disclosure.
Figure 17:
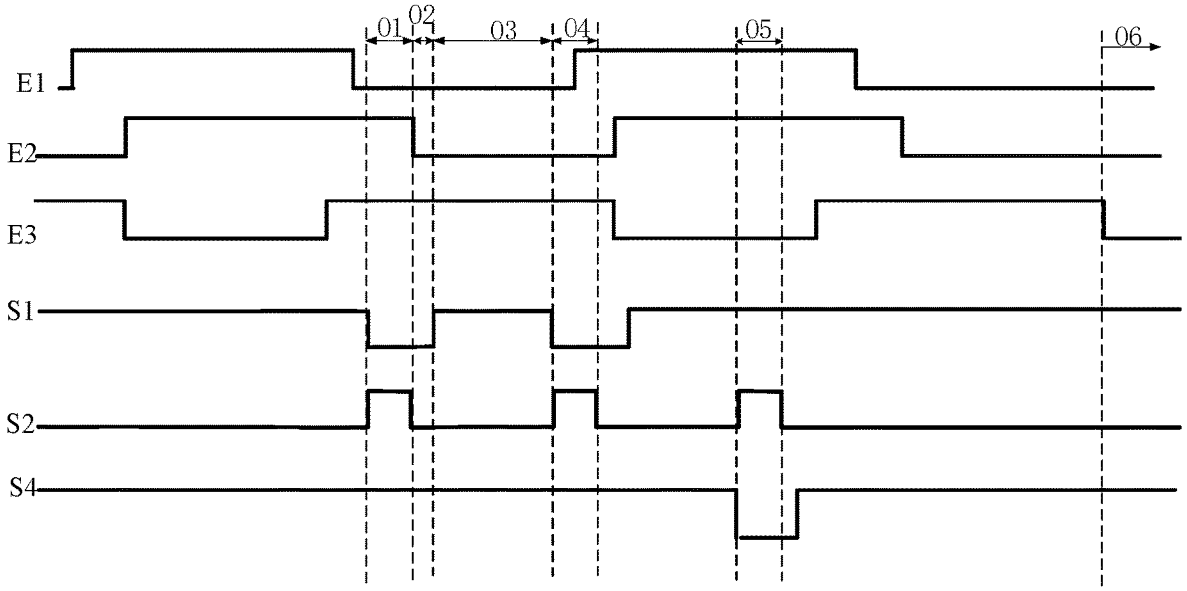
FIG. 17 illustrates an operating timing sequence diagram corresponding to an exemplary pixel driving circuit in FIG. 16 consistent with disclosed embodiments of the present disclosure.

FIG. 16 illustrates a schematic circuit diagram of another pixel driving circuit consistent with disclosed embodiments of the present disclosure; and FIG. 17 illustrates an operating timing sequence diagram corresponding to the pixel driving circuit in FIG. 16, where O1 represents a first bias stage A, O2 represents a first bias stage B, O3 represents a second bias stage, O4 represents a reset stage, O5 represents a data writing stage, and O6 represents a light-emitting stage. Compared with the embodiment associated with FIG. 3, in the embodiment associated with FIG. 16, a tenth transistor M10 may be introduced between the light-emitting component D1 and the light-emitting controller 10. A control terminal of the tenth transistor may be connected to the output terminal E3 of the light-emitting control circuit. The output terminal E3 of the light-emitting control circuit and the output terminal E1/E2 may correspond to light-emitting control circuit units at different levels. It should be noted that, optionally, the tenth transistor M10 may be connected between the driving transistor M0 and the light-emitting controller 10. The operating process of the pixel driving circuit in FIG. 16 may be described in detail below with reference to FIG. 17.

In the O1 stage, i.e., the first bias stage A, the output terminal E1 of the light-emitting control circuit may be at a low-level, the output terminal E2 of the light-emitting control circuit may be at a high-level, the first control signal terminal S1 may be at a low-level, the second control signal terminal S2 may be at a high-level, and the second transistor and the first transistor may be turned on. The high-level signal of the output terminal E2 may be transmitted to the first node N1, and in view of this, the first node N1 may be at a high-level.

In the O2 stage, i.e., the first bias stage B, the output terminal E2 of the light-emitting control circuit may become at a low-level, the second control signal terminal S2 may become at a low-level, the second transistor may be turned on, and the first transistor may be turned off. The low-level signal of the output terminal E2 may be transmitted to the third node N3, to adjust the driving transistor M0 to a positive bias state.

In the second bias stage O3, the output terminal E3 of the light-emitting control circuit may be maintained at a high-level, the potentials of the first node and the third node may be maintained, and the driving transistor M0 may be maintained at the positive bias state.

In the reset stage O4, the output terminal E2 of the light-emitting control circuit may be at a low-level, the first control signal terminal S1 may be at a low-level, the second control signal terminal S2 may be at a high-level, and the second transistor M2, the first transistor M1, and the four transistor M4 may be turned on. The low-level of the output terminal E2 may reset the first node N1 and the light-emitting component, and the driving transistor M0 may be turned on.

In the data writing stage O5, the first control signal terminal S1 may be at a high-level, the second control signal terminal S2 may be at a high-level, the fourth control signal terminal S4 may be at a low-level, and both the first transistor M1 and the seventh transistor M7 may be turned on. The signal of the data signal terminal Vdata may be written into the first node N1 through the driving transistor M0 and the first transistor M1.

In the light-emitting stage O6, the output terminals E1, E2, and E3 of the light-emitting control circuit may be at a low-level, the signal of the first power signal terminal PVDD may be transmitted to the driving transistor M0, and the driving transistor M0 may generate a driving current to drive the light-emitting component D1 to emit light.

Figure 18:
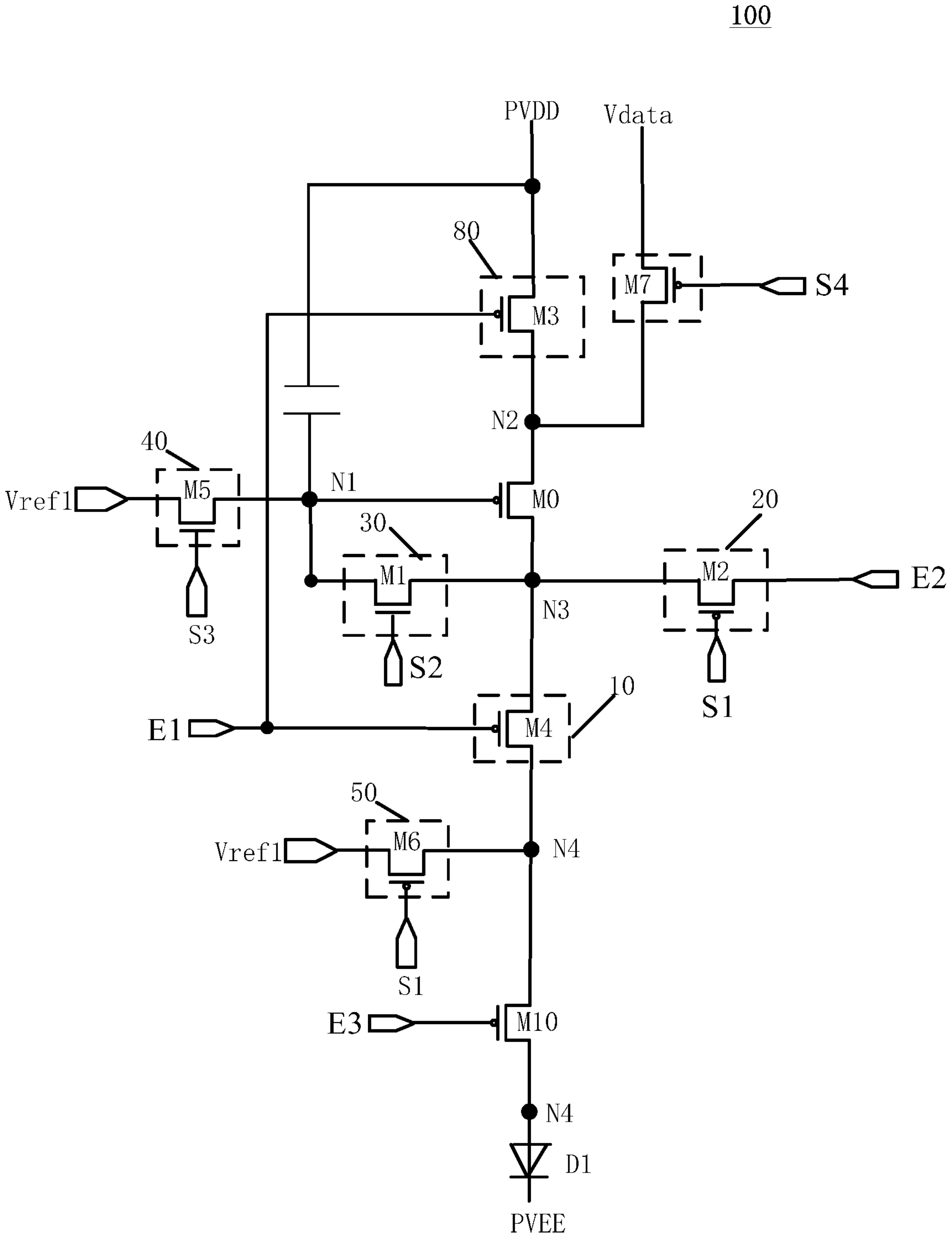
FIG. 18 illustrates a schematic circuit diagram of another exemplary pixel driving circuit consistent with disclosed embodiments of the present disclosure.
Figure 19:
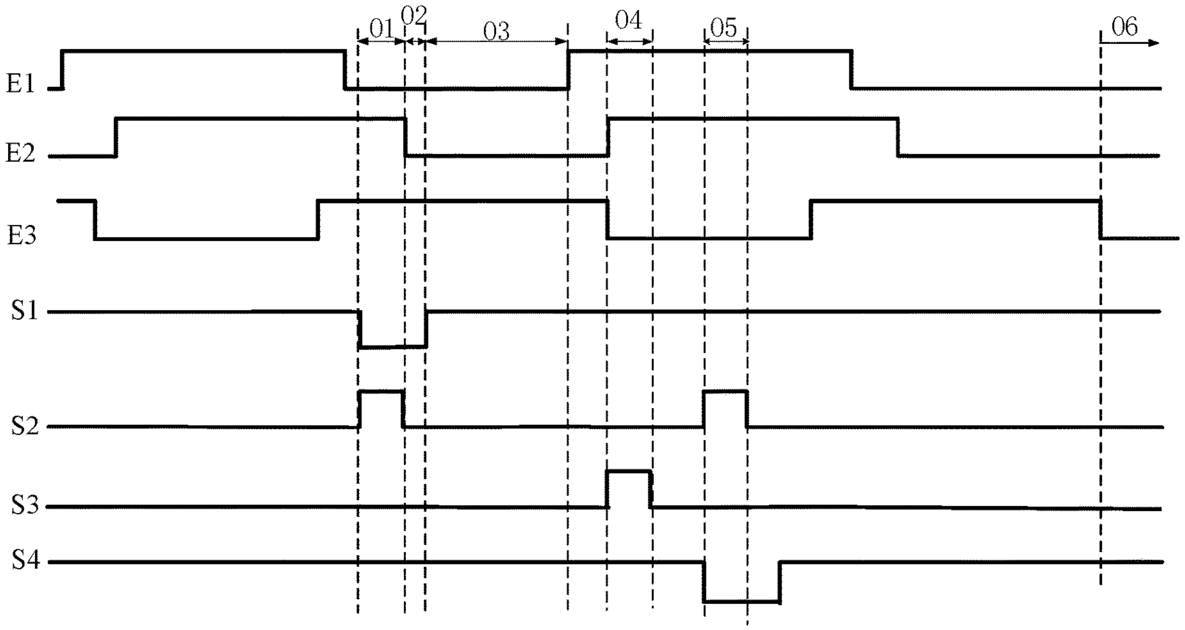
FIG. 19 illustrates an operating timing sequence diagram corresponding to an exemplary pixel driving circuit in FIG. 18 consistent with disclosed embodiments of the present disclosure.

FIG. 18 illustrates a schematic circuit diagram of another pixel driving circuit consistent with disclosed embodiments of the present disclosure; and FIG. 19 illustrates an operating timing sequence diagram corresponding to the pixel driving circuit in FIG. 18, where O1 represents a first bias stage A, O2 represents a first bias stage B, O3 represents a second bias stage, O4 represents a reset stage, O5 represents a data writing stage, and O6 represents a light-emitting stage. Compared with the embodiment associated with FIG. 5, in the embodiment associated with FIG. 18, a tenth transistor M10 may be introduced between the light-emitting component D1 and the light-emitting controller 10. A control terminal of the tenth transistor may be connected to the output terminal E3 of the light-emitting control circuit. The output terminal E3 of the light-emitting control circuit and output terminal E1/E2 may correspond to light-emitting control circuit units at different levels. It should be noted that, optionally, the tenth transistor M10 may be connected between the driving transistor M0 and the light-emitting controller 10. The operating process of the pixel driving circuit in FIG. 18 may be described in detail below with reference to FIG. 19.

In the O1 stage, i.e., the first bias stage A, the output terminal E1 of the light-emitting control circuit may be at a low-level, the output terminal E2 of the light-emitting control circuit may be at a high-level, the first control signal terminal S1 may be at a low-level, the second control signal terminal S2 may be at a high-level, and the second transistor M2 and the first transistor M1 may be turned on. The high-level signal of the output terminal E2 may be transmitted to the first node N1, and in view of this, the first node N1 may be at a high-level.

In the O2 stage, i.e., the first bias stage B, the output terminal E2 of the light-emitting control circuit may become at a low-level, the second control signal terminal S2 may become at a low-level, the second transistor M2 may be turned on, and the first transistor M1 may be turned off. The low-level signal of the output terminal E2 may be transmitted to the third node N3, to adjust the driving transistor M0 to the positive bias state.

In the second bias stage O3, the output terminal E3 of the light-emitting control circuit may be maintained at a high-level, the potentials of the first node N1 and the third node N3 may be maintained, and the driving transistor M0 may be maintained at the positive bias state.

In the reset stage O4, the third control signal terminal S3 may be at a high-level, and the fifth transistor M5 may be turned on. The reset signal of the first reset signal terminal Vref1 may be transmitted to the first node to reset the first node N1. In the present embodiment, the signal of the first reset signal terminal Vref1 may be used to reset the first node N1. The signal outputted by the first reset signal terminal Vref1 may be a DC signal, and the DC signal may not be easily interfered by any other signal, which may facilitate to increase the signal stability of the potential of the first node N1 and the potential of the fourth node N4 after being reset, and may facilitate to improve the reset effect.

In the data writing stage O5, the fourth control signal terminal S4 may be at a low-level, the second control signal terminal S2 may be at a high-level, and both the first transistor M1 and the seventh transistor M7 may be turned on. The signal of the data signal terminal Vdata may be written into the first node N1 through the driving transistor M0 and the first transistor M1.

In the light-emitting stage O6, the output terminals E1, E2, and E3 of the light-emitting control circuit may be at a low-level, the signal of the first power signal terminal PVDD may be transmitted to the driving transistor M0, and the driving transistor M0 may generate a driving current to drive the light-emitting component D1 to emit light.

Optionally, in the embodiment associated with FIGS. 18-19, the first control signal terminal S1 and the fourth control signal terminal S4 may be multiplexed as a same signal terminal. In view of this, adjacent two low-level signals outputted by the same signal terminal may be separated by a certain time interval, and such time interval may set aside sufficient period of time for the second bias stage. Therefore, the bias state of the driving transistor M0 may be maintained for a substantially long duration, to ensure that the driving transistor M0 may be maintained at the fixed positive bias state before the data writing stage. Thus, the driving transistor M0 may be prevented from being affected by the last frame data, and may generate a driving current same or nearly same as the preset driving current in the current frame, which may avoid the screen flickering or screen shaking phenomena when switching between different frames, and may facilitate to improve the screen display effect.

The embodiments associated with FIGS. 16-19 illustrate a scheme for adjusting the bias state of the driving transistor to the fixed positive bias state before the data writing stage, which may improve the potential difference between the gate potential and the drain potential of the driving transistor M0, may weaken the polarization of ions inside the driving transistor M0, and may reduce the threshold voltage of the driving transistor M0. The threshold voltage of the driving transistor M0 may be adjusted by biasing the driving transistor M0. In view of this, before switching frames, the bias state of the driving transistor M0 may be adjusted to the fixed positive bias state, such that the driving transistor may not be affected by the last frame data, and may still generate a driving current corresponding to the preset to-be-switched frame. Therefore, the frame may be quickly switched to the preset to-be-switched frame, which may facilitate to improve the flickering phenomenon occurred when switching frames and to improve the display effect.

Figure 20:
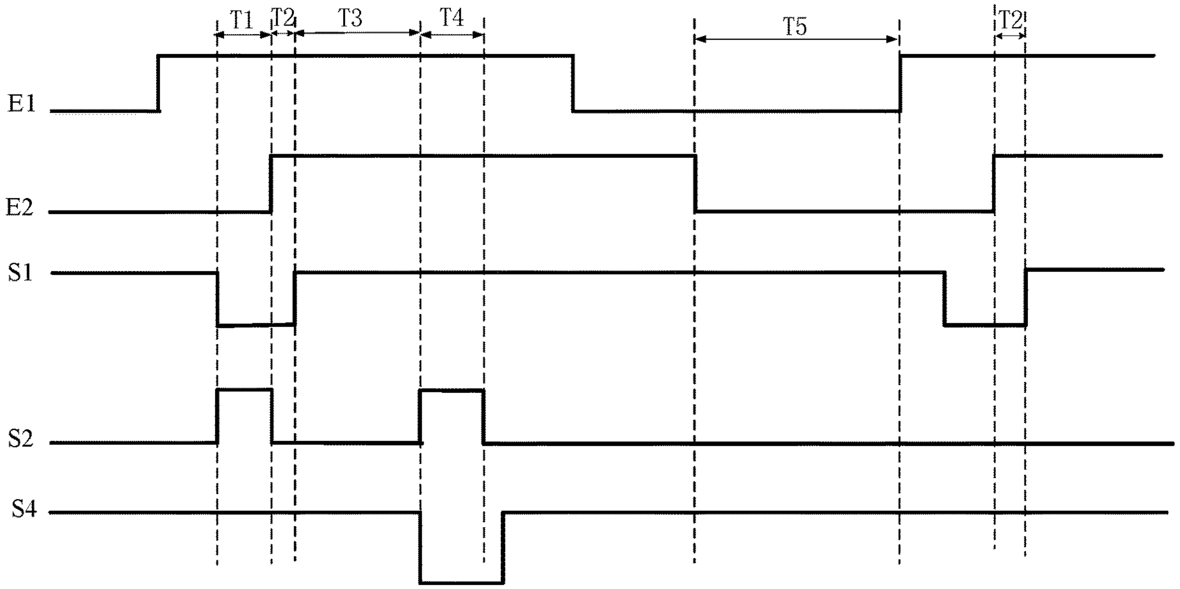
FIG. 20 illustrates another operating timing sequence diagram corresponding to an exemplary pixel driving circuit in FIG. 3 consistent with disclosed embodiments of the present disclosure.

In an optional embodiment of the present disclosure, in a same driving cycle, at least one first bias stage may be located after the light-emitting stage, which may be described below with reference to FIG. 3 and FIG. 20. FIG. 20 illustrates another operating timing sequence diagram corresponding to the pixel driving circuit in FIG. 3, which illustrates a scheme of performing the first bias stage again after the light-emitting stage, where T1 represents the reset stage, T2 represents the first bias stage, T3 represents the second bias stage, T4 represents the data writing stage, and T5 represents the light-emitting stage. The operating process of the pixel driving circuit in FIG. 3 may be described in detail below with reference to FIG. 3 and FIG. 20.

Referring to FIG. 3 and FIG. 20, in the reset stage T1, the output terminal E1 of the light-emitting control circuit may be at a high-level, and the third transistor M3 may be turned off. The output terminal E2 of the light-emitting control circuit may be at a low-level, and the fourth transistor M4 may be turned on. The first control signal terminal S1 may be at a low-level, and the second transistor M2 may be turned on. The second control signal terminal S2 may be at a high-level, and the first transistor M1 may be turned on. The low-level signal of the output terminal E2 of the light-emitting control circuit may be transmitted to the first node N1 and the fourth node N4, to reset the driving transistor M0 and the light-emitting component.

In the first bias stage T2, the output terminal E1 of the light-emitting control circuit may be at a high-level, and the third transistor M3 may be turned off. The output terminal E2 of the light-emitting control circuit may be at a high-level, and the fourth transistor M4 may be turned off. The first control signal terminal S1 may be at a low-level, and the second transistor M2 may be turned on. The second control signal terminal S2 may be at a low-level, and the first transistor M1 may be turned off. The high-level signal of the output terminal E2 of the light-emitting control circuit may be transmitted to the third node N3 and the second node N2 of the driving transistor M0. In the present embodiment, in the first bias stage, the compensation unit 30 and the light-emitting controller 10 may be turned off, and the bias unit 20 may be turned on. The second end of the bias unit 20 may output a first signal to the third node N3 and the second node N2, respectively, to adjust the driving transistor M0 to the negative bias state.

In the second bias stage T3, the output terminal E1 of the light-emitting control circuit may be maintained at a high-level, and the output terminal E2 of the light-emitting control circuit may be maintained at a high-level. The second node N2 and the third node N3 of the driving transistor M0 may be maintained at a high-level, to enable the driving transistor M0 to be maintained at the negative bias state.

In the data writing stage T4, the output terminals E1 and E2 of the light-emitting control circuit may be maintained at a high-level, and the third transistor M3 and the fourth transistor M4 may be maintained at an off state. The first control signal terminal S1 may be at a high-level, and the second transistor M2 may be turned off. The second control signal terminal S2 may be maintained at a high-level, and the first transistor M1 may be turned on. The fourth control signal terminal S4 may be at a low-level, and the seventh transistor M7 may be turned on. The data signal terminal Vdata may write the data signal into the second node N2 and the third node N3 of the driving transistor M0, and then the data signal may be further transmitted from the third node N3 to the first node N1.

In the light-emitting stage T5, the output terminals E1 and E2 of the light-emitting control circuit may become at a low-level, and the third transistor M3 and the fourth transistor M4 may be turned on. The first control signal terminal S1 may be at a high-level, the second control signal terminal S2 may be at a low-level, and the fourth control signal terminal S4 may be at a high-level. The first transistor M1, the second transistor M2, and the seventh transistor M7 may be turned off. The signal of the first power signal terminal may be transmitted to the driving transistor M0, and the driving transistor M0 may generate a driving current to drive the light-emitting component D1 to emit light.

Particularly, after the light-emitting stage T5, the first bias stage T2 may be introduced again, to adjust the bias state of the driving transistor M0 again. Therefore, the driving transistor M0 may be maintained at the negative bias state, may not be affected by the last frame data, and may still generate a driving current corresponding to the preset to-be-switched frame. Thus, the frame may be quickly switched to the preset to-be-switched frame, which may facilitate to improve the flickering phenomenon occurred when switching frames, and to improve the display effect.

It should be noted that in one embodiment, in addition to the first bias stage being set after the reset stage and before the data writing stage, the first bias stage may further be set after the light-emitting stage and before a following data writing stage. According to the frequency, the first bias stage may be introduced multiple times, and the bias state of the driving transistor may be adjusted every time. Optionally, in the present disclosure, the first bias stage may be introduced after the reset stage and before the data writing stage, and at the same time, the first bias stage may be introduced at least once after the light-emitting stage and before the following data writing stage, to adjust the drain potential of the driving transistor multiple times, and to improve the potential difference between the gate potential and the drain potential of the driving transistor, which may facilitate to weaken the polarization of ions inside the driving transistor and to reduce the threshold voltage of the driving transistor. The threshold voltage of the driving transistor may be adjusted by biasing the driving transistor, which may facilitate to improve the screen shaking phenomenon and display effect in the low-frequency display mode.

It should be noted that the above-mentioned embodiment may use the pixel driving circuit shown in FIG. 3 as an example to illustrate that the same driving cycle may include two first bias stages. Optionally, in the embodiments associated with FIGS. 4-9, FIG. 16 and FIG. 18, the first bias stage may be introduced at least twice in the same driving cycle, to adjust the bias state of the driving transistor multiple times and to ensure that the bias state of the driving transistor may be at a fixed bias state when switching frames, which may facilitate to improve the screen flickering or screen shaking phenomena when switching between different frames, and may facilitate to improve the screen display effect.

Figure 21:
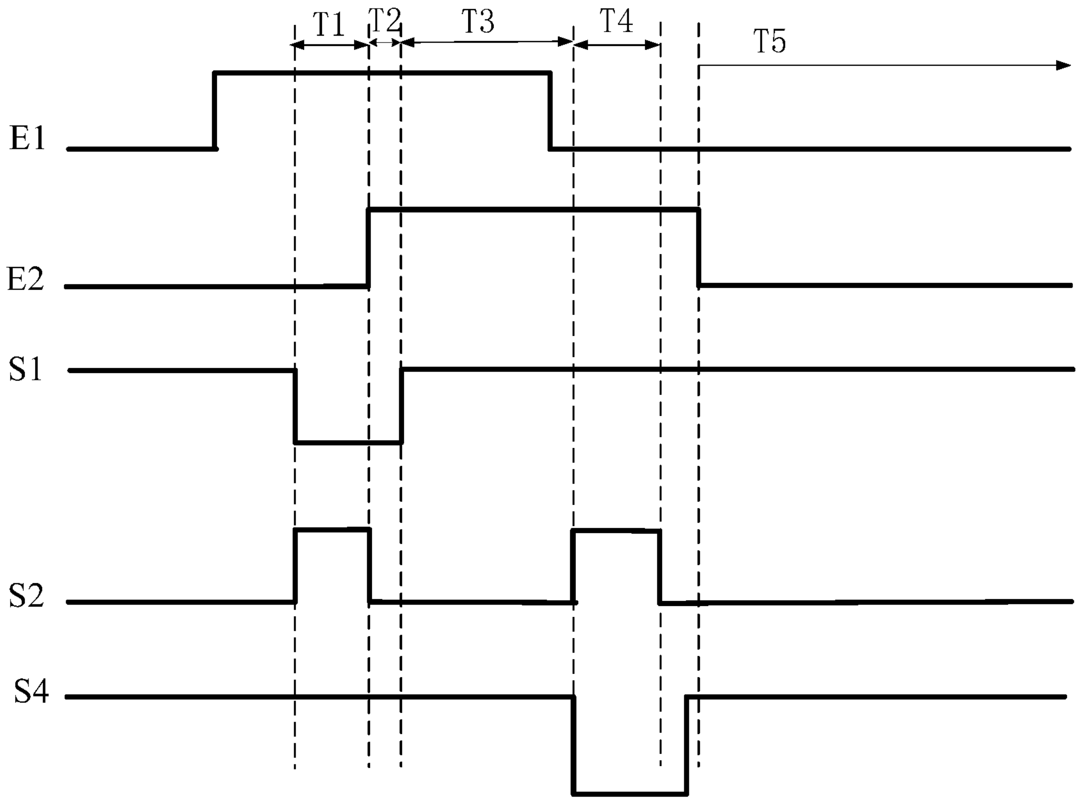
FIG. 21 illustrates an operating timing sequence diagram corresponding to an exemplary pixel driving circuit in FIG. 9 consistent with disclosed embodiments of the present disclosure.

FIG. 21 illustrates another operating timing sequence diagram corresponding to the pixel driving circuit in FIG. 9, where T1 represents the reset stage, T2 represents the first bias stage, T3 represents the second bias stage, T4 represents the data writing stage, and T5 represents the light-emitting stage. The operating process of the pixel driving circuit in FIG. 9 may be described in detail below with reference to FIG. 9 and FIG. 21.

In the reset stage T1, the first control signal terminal S1 may be at a low-level, the second control signal terminal S2 may be at a high-level, and the output terminal E2 of the light-emitting control circuit may be at a low-level. The second transistor M2 may be turned on under the control of the first control signal terminal S1, and the first transistor M1 may be turned on under the control of the second control signal terminal S2. The low-level signal of the output terminal E2 of the light-emitting control circuit may be transmitted to the first node N1, to reset the first node N1 of the driving transistor M0. At the same time, the low-level signal outputted by the output terminal E2 of the light-emitting control circuit may control the fourth transistor M4 to be turned on. Such low-level signal may be transmitted to the fourth node N4 through the fourth transistor M4, to reset the light-emitting component D1.

In the first bias stage T2, the first control signal terminal S1 may be at a low-level, the second control signal terminal S2 may be at a low-level, and the output terminal E2 of the light-emitting control circuit may be at a high-level. The second transistor M2 may be turned on, the first transistor M1 may be turned off, and the fourth transistor M4 may be turned off. The high-level signal of the output terminal E2 of the light-emitting control circuit may be transmitted to the third node N3 and the second node N2 of the driving transistor M0, to adjust the bias state of the driving transistor M0 to the negative bias state.

In the second bias stage T3, the output terminal E2 of the light-emitting control circuit may be maintained at a high-level, and the second node N2 and the third node N3 of the driving transistor M0 may be maintained at a high-level, to enable the driving transistor M0 to be maintained at the negative bias state.

In the data writing stage T4, the fourth control signal terminal S4 may be at a low-level, the second control signal terminal S2 may be at a high-level, the output terminal E1 of the light-emitting control circuit may be at a low-level, and the output terminal E2 of the light-emitting control circuit may be at a high-level. The eighth transistor M8, the third transistor M3 and the first transistor M1 may be turned on. The data signal may be transmitted to the fifth node N5 (the fifth node N5 may be located between the second end of the eighth transistor M8 and the first end of the capacitor C3) through the eighth transistor M8. The signal of the first power signal terminal PVDD may be transmitted to the driving transistor M0 through the third transistor M3, and then may be transmitted from the third node N3 to the first node N1 through the first transistor M1, to compensate the voltage of the first node N1.

In the light-emitting stage T5, the output terminals E1 and E2 of the light-emitting control circuit may be at a low-level, and the third transistor M3, the fourth transistor M4, and the ninth transistor M9 may be turned on. The low-level signal of the initialization signal terminal Vref may be transmitted to the fifth node N5, to pull down the potential of the fifth node N5. The low potential of the fifth node N5 may be coupled to the first node N1 through the third capacitor C3. The driving transistor M0 may generate a driving current according to the voltage of the first power signal terminal PVDD and the voltage of the first node N1. The driving current may be transmitted to the fourth node N4, to drive the light-emitting component D1 to emit light.

Accordingly, the pixel driving circuit, the display device and driving method provided by the present disclosure may achieve at least following beneficial effects.

In the pixel driving circuit, display panel and driving method, the bias unit may be introduced. The first end of the bias unit may be connected to the third node in the pixel driving circuit, and the second end of the bias unit may be connected to the output terminal of the light-emitting control circuit. The bias unit may be configured to adjust the bias state of the driving transistor under the control of the first control signal and the first signal outputted by the second output terminal of the light-emitting control circuit. Therefore, before the light-emitting component emits light, the bias state of the driving transistor may be maintained. The characteristics of the driving transistor when switching between different frames (e.g., white frame to black frame, or black frame to white frame) may be consistent with the characteristics of the driving transistor when switching between same frames (e.g., white frame to white frame, or black frame to black frame).

In the related technique, when switching the frames, the driving transistor may be affected by the last frame data, and may not generate a driving current corresponding to the preset to-be-switched frame, which may cause the displayed frame not to be quickly switched to the preset to-be-switched frame. For example, before switching from a black frame to a white frame, a gray frame between the black frame and the white frame may appear, and an obvious flickering phenomenon may occur, which may seriously affect the display effect.

In the present disclosure, before switching frames, the bias state of the driving transistor may be adjusted to the fixed bias state through the bias unit, such that the driving transistor may not be affected by the last frame data, and may still generate a driving current corresponding to the preset to-be-switched frame. Therefore, the frame may be quickly switched to the preset to-be-switched frame, which may facilitate to improve the flickering phenomenon occurred when switching frames, and to improve the display effect.

The description of the disclosed embodiments is provided to illustrate the present disclosure to those skilled in the art. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments illustrated herein but is to be accorded the widest scope consistent with the principles and novel features disclosed herein.

What is claimed is:

1. A pixel driving circuit, comprising:

a first power signal terminal and a second power signal terminal, wherein the first power signal terminal receives a first voltage signal, and the second power signal terminal receives a second voltage signal;

a driving transistor, configured to provide a driving current in a light-emitting stage, wherein a gate of the driving transistor is connected to a first node, a first end of the driving transistor is connected to a second node, and a second end of the driving transistor is connected to a third node;

a light-emitting component, connected in series between the driving transistor and the second power signal terminal and configured to emit light in response to the driving current;

a light-emitting controller, connected in series between the first power signal terminal and the light-emitting component, wherein a control terminal of the light-emitting controller is connected to a first output terminal of a light-emitting control circuit; and a bias unit, with a first electrode electrically connected to the third node and a second electrode electrically connected to a second output terminal of the light-emitting control circuit multiplexed as a signal input terminal of the bias unit, and in response to a first control signal, the bias unit configured to transmit a first signal outputted by the light-emitting control circuit, to the third node to adjust a bias state of the driving transistor, wherein the light-emitting control circuit includes a plurality of cascaded light-emitting control circuit units, and the first output terminal of the light-emitting control circuit and the second output terminal of the light-emitting control circuit correspond to a same output terminal of a light-emitting control circuit unit at a same level or different output terminals of light-emitting control circuit units at different levels.

2. The pixel driving circuit according to claim 1, further including:

a compensation unit, connected in series between the first node and the third node and configured to detect and self-compensate a deviation of a threshold voltage of the driving transistor.

3. The pixel driving circuit according to claim 2, wherein:

the compensation unit includes a first transistor, wherein:

the first transistor includes an oxide transistor, and a first end of the first transistor is connected to the first node, a second end of the first transistor is connected to the third node, and a control terminal of the first transistor is connected to a second control signal terminal.

4. The pixel driving circuit according to claim 2, wherein:

the compensation unit and the bias unit are multiplexed as a reset unit for the first node, and are configured to reset the first node.

5. The pixel driving circuit according to claim 1, wherein:

the bias unit includes a second transistor, wherein:

a first end of the second transistor is connected to the third node, a second end of the second transistor is connected to the second output terminal of the light-emitting control circuit, and a control terminal of the second transistor is connected to a first control signal terminal.

6. The pixel driving circuit according to claim 1, further including:

a power voltage writing unit, wherein the power voltage writing unit includes a third transistor connected in series between the first power signal terminal and the second node, and a control terminal of the third transistor is electrically connected to a third output terminal of the light-emitting control circuit.

7. The pixel driving circuit according to claim 6, wherein:

the third output terminal of the light-emitting control circuit is multiplexed as the first output terminal of the light-emitting control circuit, or the third output terminal of the light-emitting control circuit and the first output terminal of the light-emitting control circuit correspond to output terminals of the light-emitting control circuit units at different levels, respectively.

8. The pixel driving circuit according to claim 1, wherein:

the light-emitting controller includes a fourth transistor connected in series between the light-emitting component and the third node, wherein a control terminal of the fourth transistor is electrically connected to the first output terminal of the light-emitting control circuit.

9. The pixel driving circuit according to claim 1, wherein:

the second output terminal of the light-emitting control circuit is multiplexed as the first output terminal of the light-emitting control circuit.

10. The pixel driving circuit according to claim 1, wherein:

the bias unit and the light-emitting controller are multiplexed as a reset unit for the light-emitting component to reset the light-emitting component.

11. The pixel driving circuit according to claim 1, further including:

a reset unit for the first node and a reset unit for the light-emitting component, wherein:

the reset unit for the first node includes a fifth transistor, and the reset unit for the light-emitting component includes a sixth transistor, a first end of the fifth transistor is connected to the first node, a second end of the fifth transistor is connected to a first reset signal terminal, and a control terminal of the fifth transistor is connected to a third control signal terminal, a first end of the sixth transistor is connected to a first end of the light-emitting component, a second end of the sixth transistor is connected to the first reset signal terminal, and a control terminal of the sixth transistor is connected to a first control signal terminal, and a second end of the light-emitting component is electrically connected to the second power signal terminal.

12. The pixel driving circuit according to claim 1, wherein:

the first output terminal of the light-emitting control circuit and the second output terminal of the light-emitting control circuit correspond to output terminals of the light-emitting control circuit units at different levels, respectively.

13. The pixel driving circuit according to claim 1, further including:

a holding unit, connected in series between the first power signal terminal and the bias unit and configured to maintain an adjusted bias voltage.

14. The pixel driving circuit according to claim 13, wherein:

the holding unit includes a first capacitor connected in series between the first power signal terminal and the third node, wherein the first capacitor is configured to maintain a potential of the third node; or the holding unit includes a second capacitor connected in series between the first power signal terminal and the second node, wherein the second capacitor is configured to maintain a potential of the second node; or the holding unit includes a first capacitor and a second capacitor, wherein:

the first capacitor is connected in series between the first power signal terminal and the third node, and the second capacitor is connected in series between the first power signal terminal and the second node, and the first capacitor is configured to maintain a potential of the third node, and the second capacitor is configured to maintain a potential of the second node.

15. The pixel driving circuit according to claim 1, further including:

a data writing unit, configured to write a data signal into the driving transistor.

16. The pixel driving circuit according to claim 15, wherein:

the data writing unit includes a seventh transistor, wherein a first end and a second end of the seventh transistor are connected in series between a data signal terminal and the second node, and a control terminal of the seventh transistor is connected to a fourth control signal terminal; or the data writing unit includes an eighth transistor, a ninth transistor, and a third capacitor, wherein:

a first end of the eighth transistor is connected to a data signal terminal, a second end of the eighth transistor is connected to a first end of the third capacitor, a second end of the third capacitor is connected to the first node, and a control terminal of the eighth transistor is connected to a fourth control signal terminal, and a first end and a second end of the ninth transistor are connected in series between an initialization signal terminal and the second end of the eighth transistor, and a control terminal of the ninth transistor is connected to the second output terminal of the light-emitting control circuit.

17. A display panel, comprising:

a pixel driving circuit, wherein the pixel driving circuit includes:

a first power signal terminal and a second power signal terminal, wherein the first power signal terminal receives a first voltage signal, and the second power signal terminal receives a second voltage signal;

a driving transistor, configured to provide a driving current in a light-emitting stage, wherein a gate of the driving transistor is connected to a first node, a first end of the driving transistor is connected to a second node, and a second end of the driving transistor is connected to a third node;

a light-emitting component, connected in series between the driving transistor and the second power signal terminal and configured to emit light in response to the driving current;

a light-emitting controller, connected in series between the first power signal terminal and the light-emitting component, wherein a control terminal of the light-emitting controller is connected to a first output terminal of a light-emitting control circuit; and a bias unit, with a first electrode electrically connected to the third node and a second electrode electrically connected to a second output terminal of the light-emitting control circuit multiplexed as a signal input terminal of the bias unit, and in response to a first control signal, the bias unit configured to transmit a first signal outputted by the light-emitting control circuit to the third node to adjust a bias state of the driving transistor, wherein the light-emitting control circuit includes a plurality of cascaded light-emitting control circuit units, and the first output terminal of the light-emitting control circuit and the second output terminal of the light-emitting control circuit correspond to a same output terminal of a light-emitting control circuit unit at a same level or different output terminals of light-emitting control circuit units at different levels.

18. A driving method of a display panel, comprising:

providing a display panel including a driving transistor, a data writing unit, a compensation unit, a light-emitting controller, a bias unit, and a light-emitting component, wherein:

the driving transistor is configured to provide a driving current in a light-emitting stage, wherein a gate of the driving transistor is connected to a first node, a first end of the driving transistor is connected to a second node, and a second end of the driving transistor is connected to a third node, the light-emitting controller is connected in series between the driving transistor and the light-emitting component, wherein a control terminal of the light-emitting controller is connected to a first output terminal of a light-emitting control circuit, and a first electrode of the bias unit is electrically connected to the third node and a second electrode of the bias unit is electrically connected to a second output terminal, of the light-emitting control circuit, multiplexed as a signal input terminal of the bias unit, wherein the light-emitting control circuit includes a plurality of cascaded light-emitting control circuit units, and the first output terminal of the light-emitting control circuit and the second output terminal of the light-emitting control circuit correspond to a same output terminal of a light-emitting control circuit unit at a same level or different output terminals of light-emitting control circuit units at different levels;

in a first bias stage of a driving cycle of the display panel, in response to a first control signal, transmitting, by the bias unit, a first signal outputted by the light-emitting control circuit to the third node to adjust a bias state of the driving transistor;

in a data writing stage of the driving cycle of the display panel, providing, by the data writing unit, a data signal for the driving transistor, and detecting and self-compensating, by the compensation unit, a deviation of a threshold voltage of the driving transistor; and in the light-emitting stage of the driving cycle of the display panel, in response to the driving current, emitting light by the light-emitting component.

19. The driving method according to claim 18, further including:

a second bias stage, wherein the second bias stage is located after the first bias stage, and is configured to maintain the bias state of the driving transistor.

20. The driving method according to claim 18, further including:

a reset stage, configured to reset the first node.

21. The driving method according to claim 20, wherein:
in a same driving cycle, the reset stage is performed before the data writing stage, and the first bias stage is located between the reset stage and the data writing stage.

22. The driving method according to claim 21, wherein:
the compensation unit and the bias unit are multiplexed as a reset unit for the first node, and the bias unit and the light-emitting controller are multiplexed as a reset unit for the light-emitting component;
in the reset stage, the bias unit, the compensation unit, and the light-emitting controller are turned on, and a second end of the bias unit outputs a reset signal to the first node and the light-emitting component, respectively; and
in the first bias stage, the compensation unit and the light-emitting controller are turned off, the bias unit is turned on, and the bias unit outputs the first signal to the third node and the second node, respectively.

23. The driving method according to claim 21, wherein:
in the reset stage, a reset unit for the first node and a reset unit for the light-emitting component are turned on, and a first reset signal terminal outputs a reset signal to the first node and the light-emitting component, respectively;
in the first bias stage, the bias unit is turned on, the reset unit for the first node and the reset unit for the light-emitting component are turned off, and the bias unit outputs a first signal to the third node and the second node, respectively.

24. The driving method according to claim 21, wherein:
in a same driving cycle, at least one first bias stage is performed after the light-emitting stage.

25. The driving method according to claim 24, wherein:
in the first bias stage, the compensation unit and the light-emitting controller are turned off, the bias unit is turned on, and the bias unit outputs the first signal to the third node and the second node, respectively.

26. The driving method according to claim 20, wherein:
in a same driving cycle, the first bias stage and the reset stage are simultaneously performed.

27. The driving method according to claim 26, wherein:
in the first bias stage, both the bias unit and the reset unit for the first node are turned on, and the bias unit outputs the first signal to the third node and the second node, respectively, and at the same time, a first reset signal terminal outputs a reset signal to the first node and the light-emitting component, respectively.

28. The driving method according to claim 20, wherein:
in a same driving cycle, the first bias stage is performed before the reset stage.

* * * * *